United States Patent
Wade et al.

(10) Patent No.: US 10,684,184 B2
(45) Date of Patent: Jun. 16, 2020

(54) PRESSURE SENSOR ASSEMBLY HAVING A CAVITY FILLED WITH GEL OR FLUID

(71) Applicant: Honeywell International Inc., Morris Plains, NJ (US)

(72) Inventors: Richard Wade, Worthington, OH (US); Jason D. Patch, Columbus, OH (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 15/684,061

(22) Filed: Aug. 23, 2017

(65) Prior Publication Data

US 2018/0306659 A1   Oct. 25, 2018

Related U.S. Application Data

(63) Continuation-in-part of application No. 15/492,874, filed on Apr. 20, 2017, now Pat. No. 10,481,024.

(51) Int. Cl.
| | |
|---|---|
| *G01L 9/00* | (2006.01) |
| *G01L 19/06* | (2006.01) |
| *G01L 19/14* | (2006.01) |

(52) U.S. Cl.
CPC ........ *G01L 9/0044* (2013.01); *G01L 19/0645* (2013.01); *G01L 19/0654* (2013.01); *G01L 19/148* (2013.01)

(58) Field of Classification Search
CPC ............ A61M 5/14244; A61M 5/1452; A61M 5/16831; A61M 2005/16863;
(Continued)

(56) References Cited

U.S. PATENT DOCUMENTS 6,229,190 B1    5/2001  Bryzek et al.
6,311,561 B1 *  11/2001 Bang ...................... G01L 9/0073
                                                   73/708
(Continued)

FOREIGN PATENT DOCUMENTS

CN    102401715 A    4/2012
DE    102011013912 A1    9/2012
(Continued)

OTHER PUBLICATIONS

Office Action for U.S. Appl. No. 15/492,874 dated Mar. 29, 2019, 15 pages.
(Continued)

*Primary Examiner* — Harshad R Patel
*Assistant Examiner* — Nigel H Plumb
(74) *Attorney, Agent, or Firm* — Alston & Bird LLP

(57) ABSTRACT

A pressure sensor assembly having a printed circuit board (PCB) with a pressure sensor mounted on the PCB, a side wall engaging the PCB, a membrane, a cavity defined by the membrane, the side wall and the PCB, and a gel or liquid filling the cavity. The pressure sensor assembly may include a fill-hole extending into the cavity through which the cavity may be filled with the gel or liquid. The fill-hole may extend through one or both of the PCB and/or the side wall. The cavity is defined in part by a septum that allows a needle to pierce the septum for filling the cavity with the gel or liquid. A method of forming the pressure sensor assembly may include filling a cavity of the pressure sensor assembly with a gel or liquid through a fill-hole and curing the gel or liquid once in the cavity.

13 Claims, 19 Drawing Sheets

(58) Field of Classification Search
CPC .... A61M 2205/3331; G01L 7/08; G01L 7/00; G01L 9/06; G01L 19/0069; G01L 19/0654; G01L 9/0044; G01L 19/0645; G01L 19/148; A61B 17/135
See application file for complete search history.

(56) References Cited

U.S. PATENT DOCUMENTS

| | | | |
|---|---|---|---|
| 6,393,922 B1 | 5/2002 | Winterer | |
| 6,441,503 B1* | 8/2002 | Webster | G01L 19/0645 257/417 |
| 6,512,255 B2* | 1/2003 | Aoki | G01L 19/141 257/254 |
| 6,877,380 B2 | 4/2005 | Lewis | |
| 6,885,291 B1 | 4/2005 | Pollack et al. | |
| 6,923,069 B1 | 8/2005 | Stewart | |
| 7,077,008 B2 | 7/2006 | Pham et al. | |
| 7,082,835 B2 | 8/2006 | Cook et al. | |
| 7,216,547 B1 | 5/2007 | Stewart et al. | |
| 7,260,994 B2 | 8/2007 | Oboodi et al. | |
| 7,493,822 B2 | 2/2009 | Stewart et al. | |
| 7,503,221 B2 | 3/2009 | Wade | |
| 7,811,123 B2 | 10/2010 | Hoath et al. | |
| 8,024,978 B2 | 9/2011 | Khemet et al. | |
| 8,061,212 B2 | 11/2011 | Shubert | |
| 8,230,743 B2 | 7/2012 | Wade et al. | |
| 8,371,176 B2 | 2/2013 | Rozgo | |
| 2003/0167851 A1 | 9/2003 | Parker | |
| 2007/0235083 A1 | 10/2007 | Dlugos | |
| 2011/0214504 A1 | 9/2011 | Bradley et al. | |

FOREIGN PATENT DOCUMENTS

| | | |
|---|---|---|
| EP | 2474819 A1 | 7/2012 |
| JP | 2006-220456 | 8/2006 |
| JP | 2016-212015 | 12/2016 |
| WO | 00/42405 A1 | 7/2000 |

OTHER PUBLICATIONS

Measurement Specialties, "RoHS 1630," Available at www.meas-spec.com, 5 pages, Jun. 2011.
Measurement Specialties, "RoHS 1620," Available at www.meas-spec.com, 6 pages, May 2012.
Measurement Specialties, "MS5541-30C Miniature 30 Bar Module," Available at www.meas-spec.com, 21 pages, Jun. 27, 2011.
Measurement Specialties, "MS5536-30C SMD Gage Pressure Module," Available at www.meas-spec.com, 18 pages, Jun. 27, 2011.
Measurement Specialties, "MS5535-30C 30 Bar Pressure Sensor Module" Available at www.meas-spec.com, 21 pages, Jun. 27, 2011.
https://www.protolabs.com/services/injection-molding/liquid-silicone-ru . . . , "Liquid Silicone Rubber Molding," Proto Labs, 4 pages, printed May 15, 2017.
The Extended European Search Report, Application No./Patent No. 18167530.7-3392634, pp. 12, dated Jan. 22, 2019.
Communication Pursuant to Article 94 (3), for European Application No. 18167503.7, dated Dec. 4, 2019.
Notice of Allowance for U.S. Appl. No. 15/492,874, dated Jul. 17, 2019, 11 pages.
Office Action for Chinese Application No. 201810360535.8, dated Dec. 9, 2019, 12 pages.
Partial European Search Report for Application No. 18167530.7, dated Sep. 14 2018, 11 pages.
Restriction Requirement for U.S. Appl. No. 15/492,874, dated Jan. 2, 2019, 6 pages.

* cited by examiner

PRESSURE SENSOR ASSEMBLY HAVING A CAVITY FILLED WITH GEL OR FLUID

PRIORITY

This application is a continuation-in-part application of U.S. patent application Ser. No. 15/492,874, filed on Apr. 20, 2017, the entirety of which is incorporated herein by reference.

TECHNICAL FIELD

The present disclosure relates generally to sensors, and more particularly to pressure sensor assembly structures.

BACKGROUND

Pressure sensors are used today to sense pressure in a wide variety of applications including, for example, medical applications, flight control applications, industrial process applications, combustion control applications, weather monitoring applications, water metering applications, as well as many other applications. Integrating such pressure sensors into a system can present certain challenges. What would be desirable is a cost effective pressure sensor that can be easily integrated into a system, such as a medical system.

SUMMARY

The present disclosure relates generally to sensors, and more particularly to pressure sensor assemblies. The present disclosure describes various pressure sensor assemblies that can be produced in a cost effective manner and can be easily integrated into a system, such as a medical system.

In one example, a pressure sensor assembly may include a printed circuit board (PCB), a pressure sensor, a side wall, a membrane, a cavity, a non-compressible gel or liquid filling the cavity that is exposed to a front side of the pressure sensor, and a fill hole extending into the cavity through which the cavity may be filled with the non-compressible gel or liquid. The PCB may have a front side and a back side. The pressure sensor may have a front side and a back side, where the pressure sensor may be mounted to the PCB with the back side of the pressure sensor facing the front side of the printed circuit board. The side wall may engage the front side of the PCB and the side wall may extend around a perimeter of the pressure sensor. The membrane, the side wall, and the PCB may define the cavity.

In another example, a reservoir assembly may include a reservoir, a biocompatible membrane, and a pressure sensor. The reservoir may have an interior for receiving a medicament and the biocompatible membrane may separate the interior of the reservoir from a cavity filled with a non-compressible gel or liquid. The pressure sensor may be exposed to the non-compressible gel or liquid in the cavity and the pressure sensor may sense a pressure in the interior of the reservoir through the biocompatible membrane and the non-compressible gel or liquid in the cavity.

An illustrative method of making a pressure sensor that includes a cavity defined in part by a membrane, with a pressure sensor exposed to the cavity. The method may include filling the cavity with a non-compressible gel or liquid through a fill-hole, and curing the non-compressible gel or liquid. In some cases, the method may include filling the cavity with a non-compressible gel or liquid through a fill-hole, and pugging the fill hole with a fill hole plug.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
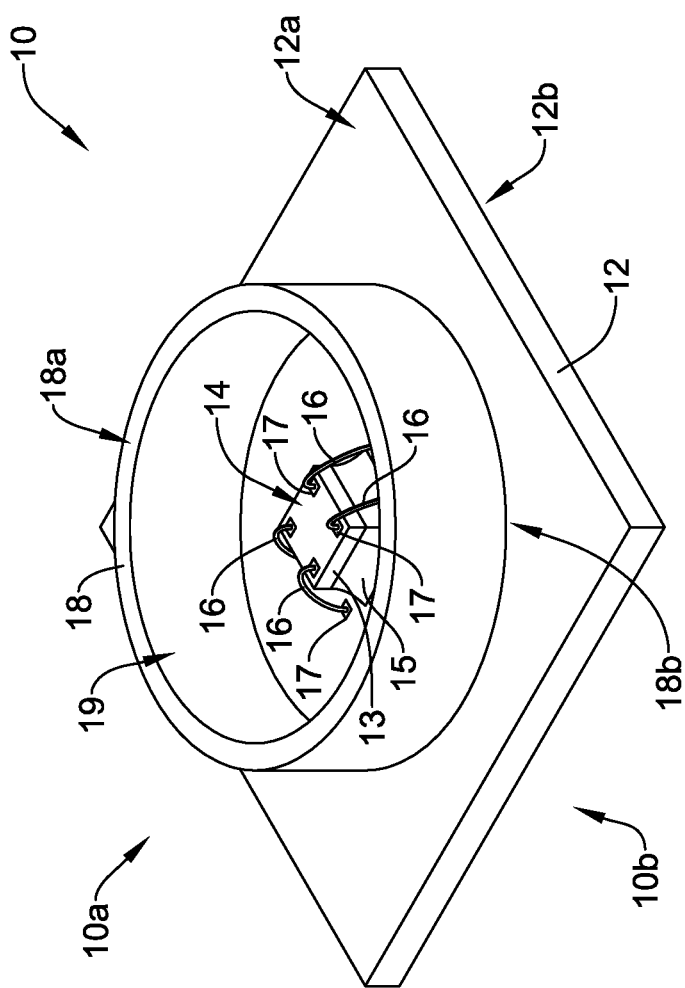
FIG. 1 is a schematic perspective view of an illustrative sensor assembly with the force transmitting member removed.

While the disclosure is amenable to various modifications and alternative forms, specifics thereof have been shown by way of example in the drawings and will be described in detail. It should be understood, however, that the intention is not to limit aspects of the disclosure to the particular embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative of the disclosure.

FIG. 1 is a schematic perspective view of an illustrative sensor assembly with the force transmitting member removed. The illustrative sensor assembly 10 (e.g., a sensing unit) may have a first side 10a and a second side 10b, a printed circuit board (PCB) 12 having a first side 12a (e.g., a front side) and a second side 12b (e.g., a second side), a pressure sensor 14 mechanically and/or electrically connected to the PCB 12 (e.g., via wire bonds, solder, adhesive, and/or other connection), a support ring 18 having a first side 18a (e.g., a front side) and a second side 18b (e.g., a back side), and/or one or more other components. Although not shown in FIG. 1, an insert (e.g., a media isolation layer and/or a force transmitting member or material) may fill or at least partially fill the support ring 18 and encapsulate the components within a cavity 19 or opening defined by the support ring 18.

The PCB 12 of the pressure sensor assembly 10 may be any type of PCB. In some cases, the PCB 12 may be a thick film printed ceramic board, but this is not required. In one example, the PCB may be made, at least in part, of FR 4 laminate and/or other material.

Although not particularly detailed in the Figures, the PCB 12 may have one or more electronic components thereon and/or pads for connecting to electronic components of a device in which the pressure sensor assembly 10 may be inserted or with which the pressure sensor assembly 10 may be used. In one example, the PCB 12 may include an application specific integrated circuit (ASIC) that may be attached to the first side 12a or the second side 12b of the PCB 12. Such an ASIC may be electrically connected to the PCB 12 via wire bonds, bump bonds, electrical terminals, and/or any other suitable electrical connections. Additionally or alternatively, the PCB may include one or more conductive pads for engaging circuitry and/or electronic components in communication with a remote processor or the like.

Further, the PCB 12 may include one or more processing electronics and/or compensation circuitry (e.g., which may or may not include an ASIC). Such processing electronics may be electrically connected to terminals of the pressure sensor 14, an ASIC (if present), and/or electrical terminals to process electrical signals from the pressure sensor 14 and/or to transfer outputs from the pressure sensor 14 to electronic components of one or more devices used in conjunction with the pressure sensor assembly 10. In some instances, the PCB 12 may include circuitry that may be configured to format one or more output signals provided by the pressure sensor 14 into a particular output format. For example, circuitry of the PCB 12 (e.g., circuitry on one or more of the first side 12a and the second side 12b of the PCB 12) may be configured to format the output signal provided by pressure sensor 14 into a ratio-metric output format, a current format, a digital output format and/or any other suitable format. In some cases, the circuitry of the PCB 12 may be configured to regulate an output voltage. Circuitry on the PCB 12 for providing a ratio-metric (or other) output may include traces and/or other circuitry that may serve as a conduit to test pads, and/or for providing the ratio-metric (or other) output to one or more electrical terminals facilitating electrical connections with electronic components of one or more devices used with the pressure sensor assembly 10.

Figure 2:
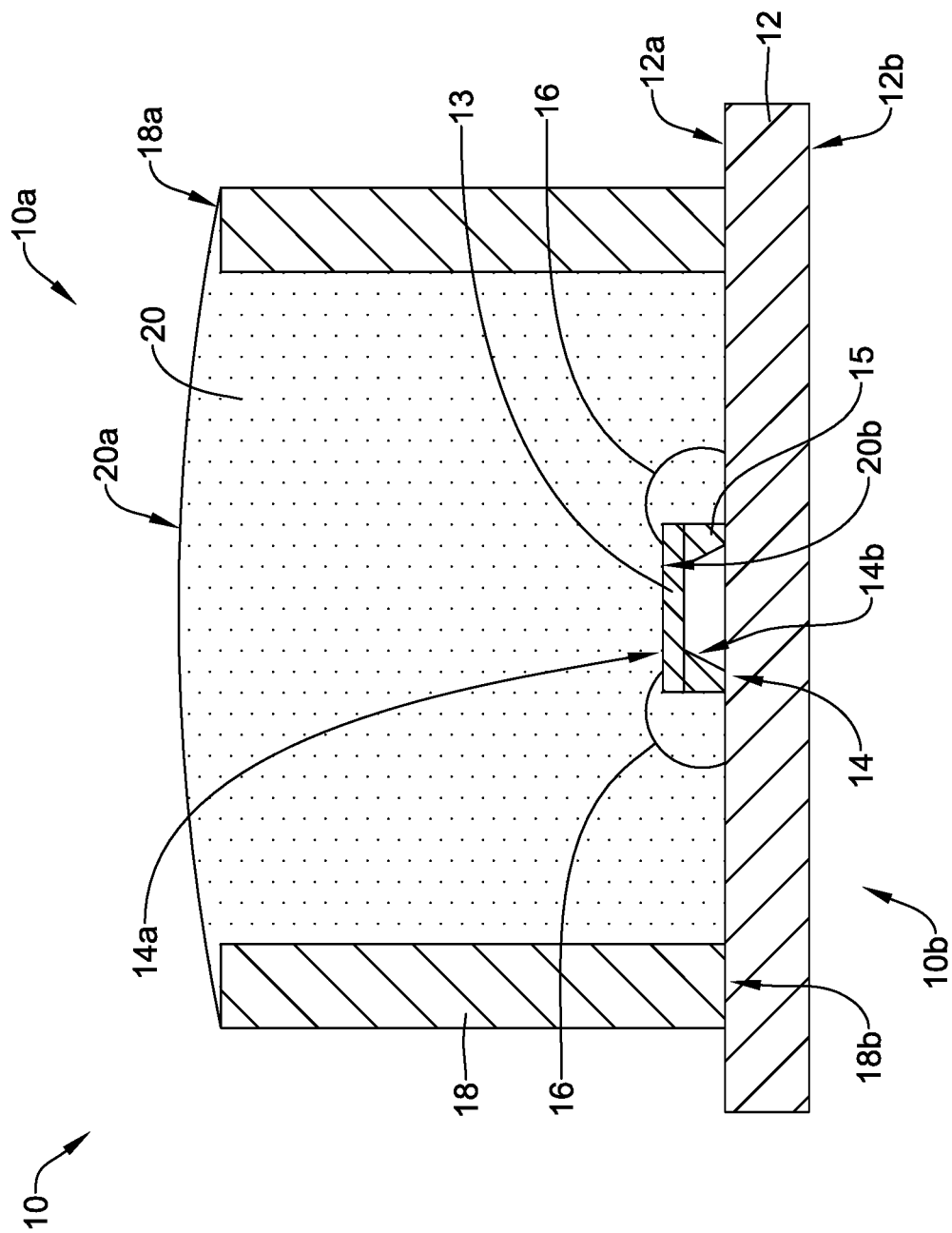
FIG. 2 is a schematic cross-section view of the illustrative sensor assembly of FIG. 1 with an illustrative force transmitting member.
Figure 3:
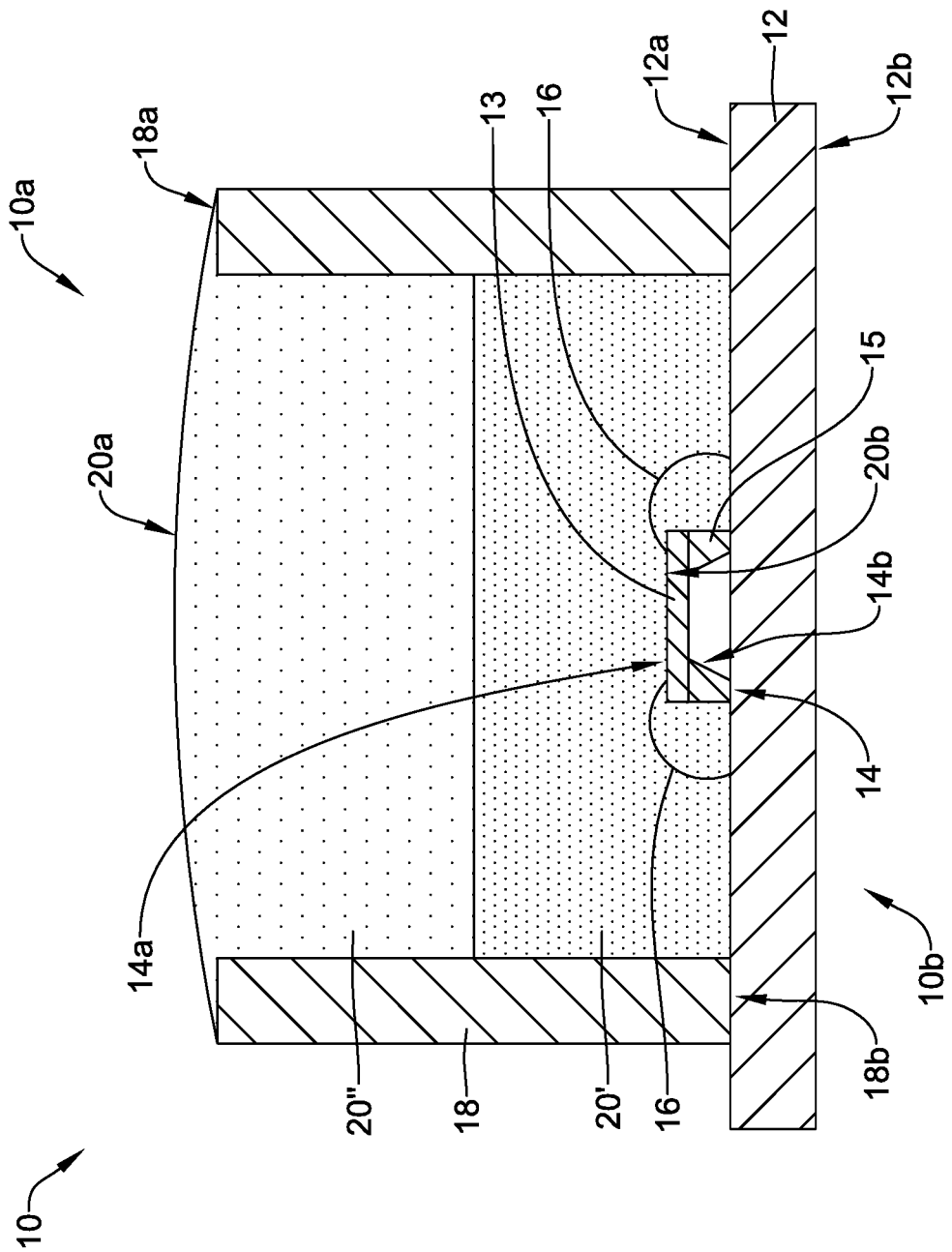
FIG. 3 is a schematic cross-section view of the illustrative sensor assembly of FIG. 1 with another illustrative force transmitting member.
Figure 4:
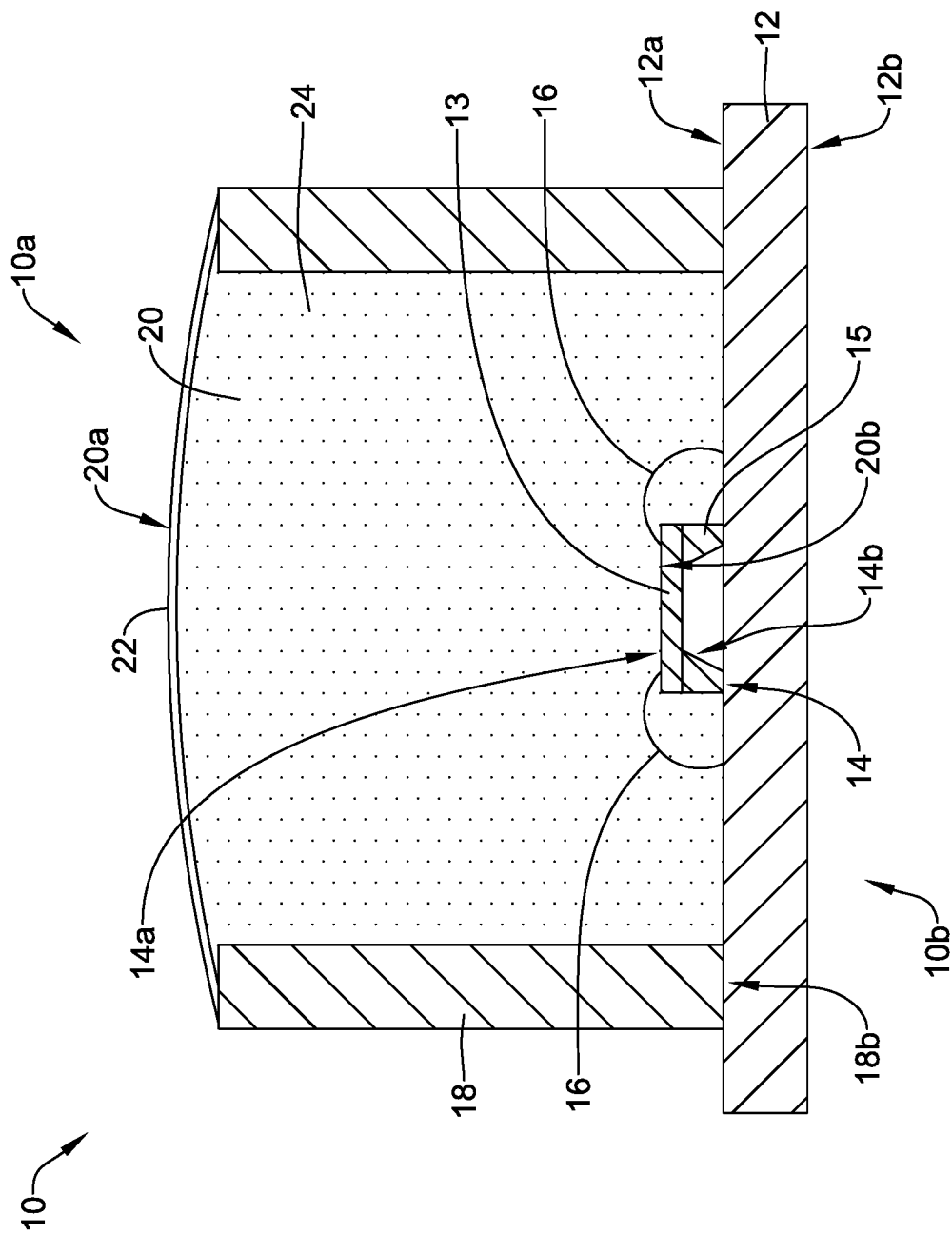
FIG. 4 is a schematic cross-section view of the illustrative sensor assembly of FIG. 1 with yet another illustrative force transmitting member.

The pressure sensor 14 of the pressure sensor assembly 10 may be configured in any manner and may have a first side 14a (e.g., a front side) and a second side 14b (e.g., a back side) (see FIGS. 2-4). In some cases, the pressure sensor 14 may include a micro-machined pressure sense die that includes a sense diaphragm. The pressure sense die may be secured directly to the PCB 12 and/or may be secured to a constraint 15 (as shown in FIG. 1), and the constraint 15 is secured to the PCB 12. The constraint 15, when included, may help isolate the pressure sense die from stresses induced by the PCB 12 and/or packaging in which the pressure sensor 14 is mounted. The constraint 15 may be bonded, anodically or by other means, to the pressure sense die 13. The constraint 15 may be made of any material. In some cases, the constraint 15 may made of glass, silicon, or other material.

In some cases, the pressure sensor 14 may be back-side mounted on the first side 12a of the PCB 12 with the second side 14b of the pressure sensor 14 facing the first side 12a of the PCB 12 and may be configured to perform top-side sensing (e.g. sensing with the first side 14a of the pressure sensor 14). In a pressure sensor configuration, the top-side sensing may be when a sensed media either directly or indirectly (e.g., through the force transmitting member 20 or other intermediary) interacts with a top side of the pressure sensor 14, where a back- or bottom-side of the pressure sensor 14 may be etched inward toward the top-side to form a sensing diaphragm.

Back-side mounting the pressure sensor 14 to the first side 12a of the PCB 12 may facilitate creating a robust pressure sensor assembly 10, where the first side 12a (e.g., the front side) may be configured to face an interior of a reservoir and/or a location of sensed media. In one example, back-side mounting the pressure sensor 14 to the first side 12a of the PCB 12 may create a more robust pressure sensor assembly 10 because any sensed media acting on the pressure sensor 14 may act to push the pressure sensor 14 against the PCB 12. Additionally, such a configuration may allow for a smaller pressure sensor 14 when compared to sensor units in which a pressure sensor 14 may be mounted to the second side 12b of the PCB 12 that faces away from an interior of the reservoir and/or a location of sensed media. Such a smaller pressure sensor 14 may be possible, at least in part, because less sense element surface area is needed to attached the pressure sensor 14 to PCB 12 when the pressure sensor 14 is connected to the first side 12a of the PCB 12 facing the interior of a reservoir and/or a location of sensed media due to forces from the interior of the reservoir and/or a location of sensed media pushing the pressure sensor 14 into the PCB 12 instead of pushing the pressure sensor 14 away from the PCB 12.

Although the pressure sensor 14 may be described herein as being back-side mounted to the first side 12a of the PCB 12, it is contemplated that the pressure sensor 14 may be mounted relative to the PCB 12 in one or more other configurations. For example, the pressure sensor 14 may be front side mounted, and/or the pressure sensor 14 may be mounted in any other suitable manner.

The pressure sensor 14 may be electrically connected to the PCB 12 in one or more manners. In one example, wire bonds 16 may be utilized to electrically connect the pressure sensor 14 to the PCB 12. In such a case, the wire bonds 16 may have a first end connected to a bond pad 17 of the pressure sensor 14 and another end connected to a bond pad 17 of the PCB 12. Additionally or alternatively, the pressure sensor 14 may be electrically connected to the PCB via bump bonds and/or in any other suitable manner.

The micro-machined pressure sense die of the pressure sensor 14 may have any size or shape. In some cases, the pressure sense die may have a thickness between about 200 microns and about 800 microns and a surface area between about 10,000 microns$^2$ and about 4,000,000 microns$^2$. In some examples, the pressure sense die may have a thickness dimension between about 380 microns and about 410 microns and a surface area between about 200,000 microns$^2$ and about 500,000 microns$^2$. In one example, the pressure sense die may have a thickness dimension of about 390 microns and a surface area of about 390,625 microns$^2$ (e.g., when the pressure sense die is rectangular or square, the pressure sense die may have edges of about 625 microns in length).

The pressure sense die of the pressure sensor 14 may be arranged to sense an absolute pressure, where a pressure of fluid in the reservoir 30 is referenced against a vacuum pressure or other reference pressure. When sensing an absolute pressure, the pressure sense die 13 and/or the constraint 15 may be fabricated to include a vacuum or reference cavity immediately behind a sense diaphragm, such that a pressure of fluid in the reservoir 30 is referenced against a vacuum (not specifically shown) or other reference pressure. Alternatively, the pressure sense die may be arranged to sense a gauge pressure. In such a gauge pressure sensor, the PCB 12 and/or the constraint 15 may include an opening extending from the pressure sense die 13 through the PCB 12 (e.g., extending through the PCB 12 from the first side 12a to the second side 12b of the PCB 12) to allow a reference pressure to reach the back side of the pressure sense die 13. Example pressure sensor die may include, but are not limited to, those described in U.S. Pat. Nos. 7,503,221; 7,493,822; 7,216,547; 7,082,835; 6,923,069; 6,877,380, and U.S. patent application publications: 2010/0180688; 2010/0064818; 2010/00184324; 2007/0095144; and 2003/0167851, all of which are hereby incorporated by reference.

In some cases, the support ring 18 of the pressure sensor assembly may entirely or at least partially circumferentially surround and/or enclose the pressure sensor 14, wire bonds 16, bond pads 17, the force transmitting member 20, and/or other components of the pressure sensor assembly 10. The support ring 18 may have a circular cross-section, but this is not required and the support ring 18 may take on one or more shapes having a circular cross-section and/or a different shaped cross-section.

The support ring 18 may be connected to the first side 12a of the PCB 12 such that the second side 18b of the support ring 18 may face the first side 12a of the PCB 12 and the first side 18a of the support ring 18 may be spaced away from the first side 12a of the PCB 12. In some cases, the support ring 18 may be attached to at least a portion of the first side 12a of the PCB 12 to provide additional support that adds structural integrity to the pressure sensor assembly 10. The first side 18a of the support ring 18 may at least partially define an opening from the first side 18a of the support ring 18 to the pressure sensor 14 (e.g., the cavity 19 defined by the support ring 18). The support ring 18 may be made from any type of material. In one example, the support ring 18 may be made from a plastic, a metal, a ceramic and/or any other suitable material.

In some cases, an attach or adhesive may be used to mechanically and/or electrically connect one or more of the pressure sensor 14, the support ring 18 and/or other components of the pressure sensor assembly 10 to the first side 12a of the PCB 12. The adhesive may be a single piece or layer of adhesive, or may include two or more pieces or layers of adhesive. The adhesive may be any adhesive capable of facilitating assembly of the pressure sensor assembly 10, such as an epoxy adhesive or other similar or different adhesives. Illustrative adhesives may include, but are not limited to, an adhesive having the ingredients of at least Bisphenol-A type epoxy resin, Diglycidyl ether of neopentyl glycol, cycloaliphatic/aliphatic amine, aluminum oxide, carbon black, and amorphous silicon dioxide; an adhesive having the ingredients of epoxy phenol novalac (25%-50% by weight), aluminum powder (10%-25% by weight), flexibilizer epoxy resin (10%-25% by weight), curing agent (2.5%-10% by weight), siloxane treated silicon dioxide (2.5%-10% by weight), silicon dioxide, chemically prepared (≤2.5% by weight), and curing agent (≤2.5% by weight); and an adhesive having the ingredients of epoxy resin (70%-90% by weight), non-volatile amide (10%-30% by weight) and amorphous silica (1%-5% by weight), or other suitable adhesives as desired.

FIGS. 2-4 depict cross-section views of a pressure sensor configuration of the pressure sensor assembly 10 with various configurations of a force transmitting member located at least partially within the opening or cavity 19 defined by the support ring 18. Although the pressure sensor assembly 10 may be depicted in FIGS. 2-4 as a gauge pressure sensor, the pressure sensor assembly 10 may be or may include any type of pressure sensor including an absolute pressure sensor.

In some cases, the support ring 18 may be entirely or at least partially around the perimeter of the pressure sensor 14, wire bonds 16, the force transmitting member 20, and/or other components of the pressure sensor assembly 10. Further, the force transmitting member 20 may fill or at least partially fill the opening or cavity 19 of the support ring 18 to facilitate transferring a force interacting with the first side 20a (e.g., front side) of the force transmitting member 20 to the pressure sensor 14 and/or to protect components of the pressure sensor assembly 10 from the sensed media. In some cases, the force transmitting member 20 may have a first side 20a (e.g., a front side) and a second side 20b (e.g., a back side), where the first side 20a is configured to interact with a sensed media and the second side 20b interacts with the pressure sensor 14 such that at least some of the force (caused by pressure) acting on the first side 20a of the force transmitting member 20 is transferred to the second side 20b of the force transmitting member 20 and to the pressure sensor 14.

The force transmitting member 20 may be formed from one or more layers of material. For example, the force transmitting member 20 may be formed from one layer of material, two layers of material, three layers of material, four layers of material, five layers of material, or other number of layers of material.

The force transmitting member 20 may be made from any suitable material. Example types of material may include dielectric material, a non-compressible material, a biocompatible material, colored material, non-colored material, and/or one or more other types of material. Example materials acceptable for use as or in the force transmitting member 20 may include fluoro-silicone gel, a cured silicone rubber or silicone elastomer, a cured liquid silicone rubber, an oil and/or any other suitable material. In one example, the force transmitting member 20 may include a biocompatible material that is medically safe to directly contact medicines or the like that are to be provided to a patient. One such biocompatible material is a cured silicone elastomer. This is just one example.

Silicone elastomers are polysiloxanes and/or polydimethylsiloxanes. Example silicone elastomers may include SILASTIC® MDX4-421 Biomedical grade elastomer from Dow Corning Corporation, SILPURAN® 2430 (e.g., an addition curing RTV silicone rubber curing to a silicon elastomer) from Wacker Chemie AG, and/or one or more other silicone elastomers.

The force transmitting member 20 may be formed using any suitable technique. For example, the force transmitting member 20 may be formed with one or more of a molding technique, a curing technique, a mixing technique, a trimming technique, and/or one or more other techniques. In one example, a silicone elastomer liquid material may be inserted into the support ring 18 and then cured to cure the liquid material and cause it to solidify and maintain a shape at least partially defined by the support ring 18. In another example, the pressure sensor assembly 10, without the force transmitting member 20 and, optionally, without the gel ring 18, may be inserted into or onto a mold, a liquid material may be added to the mold and then cured. The mold may then be removed and the pressure sensor assembly 10 with the force transmitting member 20 may be formed. Further, in another example, an opening or cavity (e.g., the cavity 40, discussed below with respect to FIG. 6 through 16) in a reservoir or other fluid container in which the pressure sensor assembly 10 may be located in an application may be utilized as a form or mold. In such cases, a piston arm or other feature of the reservoir or other occlusion may be advanced against one side of the opening or cavity, a liquid may be inserted into the opening or cavity, the pressure sensor assembly 10, without the force transmitting member 20 and, optionally, without the gel ring 18, may be positioned on or over the liquid in the opening, and then the liquid may be cured to form the force transmitting member 20 with or without a gel ring 18, which results in a pressure assembly 10 in a desired application. In yet another example, when an opening or cavity in the reservoir is at least partially used as a form or mold and has a membrane, fluid (e.g., liquid) may be inserted into the opening or cavity via a hole extending through the reservoir and/or pressure sensor assembly 10 to the opening or cavity of the reservoir, and then the fluid may be cured to form the force transmitting member configured to transmit a force from the membrane to the pressure sensor 14 of the pressure sensor assembly 10.

In an example of when a silicone elastomer is used in forming the force transmitting member 20, a silicone elastomer may be provided in a mold, a gel ring, an opening or cavity of a reservoir, or other form and then cured to take the desired form. The silicone elastomer may be cured by, for example, an addition system (e.g., a platinum-catalyzed system), a condensation cure system, a peroxide cure system, an oxime cure system, heat and/or by otherwise curing the silicone elastomer.

FIG. 2 depicts a cross-section of the pressure sensor assembly 10 with the force transmitting member 20 formed from a single material, such as a cured silicone elastomer or other material, with the force transmitting member 20 configured to receive a force at the first side 20*a* and apply the received force to the first side 14*a* of the pressure sensor 14. In this case, as the cured silicone elastomer is a biocompatible material, the cured silicone elastomer may form a surface (e.g., the first side 20*a* of the force transmitting member 20) that can directly engage a sensed media such as a medicine in a medical application.

In some cases, the first side 20*a* of the force transmitting member 20 may be formed in a dome shape, as shown in FIG. 2, but this is not required in all cases. Although not necessarily required, when the first side 20*a* is domed and/or in other configurations, the dome shape of the first side 20*a* may extend to an edge of the gel ring 18 or other location along the first side 18*a* of the support ring 18.

Note, the dome shapes depicted throughout the Figures are not drawn to scale. In some cases, the actual dome shape is less domed than what is shown in the Figures.

A dome shape to the first side 20*a* of the force transmitting member 20 may have one or more benefits over a flat or a recessed first side 20*a* of the force transmitting member 20. For example, the dome shape may facilitate removal of a fluid from a reservoir (e.g., removal of all or substantially all medicament from a reservoir), may help create a seal between the pressure sensor assembly 10 and a reservoir, and/or may facilitate abutting a membrane if one is provided over the force transmitting member 20 without creating air bubbles between the membrane and the force transmitting member 20. When domed, and/or in other configurations, the first side 20*a* of the force transmitting member 20 may extend radially beyond an inner wall of the support ring 18 and may overlap the first side 18*a* of the support ring 18 as shown in FIG. 2.

FIG. 3 depicts a cross-section of the pressure sensor assembly 10 with a force transmitting member 20 formed from two layers of materials, such as a first layer 20' and a second layer 20". The first layer 20' and the second layer 20" may be any suitable materials for transferring a force applied to the first side 20*a* of the force transmitting member 20 to the second side 20*b* of the force transmitting member 20 and the pressure sensor 14. In one example, the second layer 20" may be or may include a biocompatible material, such as a cured silicone elastomer or other biocompatible material, and the first layer 20' may be a gel (e.g., a non-compressible gel such as a fluoro-silicone gel), oil, or other material. Other material may be used as desired and in some cases, a membrane may be utilized over the first side 20*a* of the force transmitting member 20, as shown in FIG. 4.

The first and second layers 20', 20" of the force transmitting member 20 may be arranged in any order and/or may have any thickness, as desired. As shown in FIG. 3, the second layer 20" of the force transmitting member 20 may be an outer layer of the force transmitting member 20 and may form at least part of the first side 20*a* of the force transmitting member 20, which may interact directly with a sensed media and/or indirectly with a sensed media via a membrane. Further, the first layer 20' of the force transmitting member 20 may be an inner layer of the force transmitting member 20 and may form at least part of the second side 20*b* of force transmitting member 20 (e.g., a part of the force transmitting member 20 that engages the first side 14*a* of the pressure sensor 14). The force transmitting member 20 may have one or more layers between the first layer 20' and the second layer 20" or the first layer 20' may abut the second layer 20' as shown in FIG. 3. In some cases, a force acting on the second layer 20" of the first force transmitting member 20 may be transferred to the first layer 20' (e.g., directly or through one or more layers of the force transmitting member 20) and applied to the pressure sensor 14 to measure a force (caused by a pressure) at the first side 20a of the force transmitting member 20. Additionally, as discussed above, the material of the force transmitting member 20 defining the first side 20a (e.g., the second layer 20") may be domed in a manner similar to as discussed above with respect to FIG. 2.

FIG. 4 depicts a cross-section of the pressure sensor assembly 10 with a force transmitting member 20 having a membrane 22 overlaying a primary material 24 of the force transmitting member 20. The primary material 24 may be one or more materials that are configured to transfer a force from the first side 20a of the force transmitting member 20 to the second side 20b of the force transmitting member 20 including, but not limited to, a cured silicone elastomer or other biocompatible material, a gel (e.g., a non-compressible gel such as a fluoro-silicone gel), oil, or other material. The material of the membrane 22 may be any type of material that is capable of interacting with a sensed media and will not taint the sensed media. In some cases, the membrane 22 may be formed from a cured silicone elastomer or other biocompatible material.

Similar to as discussed above, the first side 20a of the force transmitting member 20 may be formed in a dome shape, as shown in FIG. 4. Such a dome shape may be formed by the primary material 24, but this is not required in all cases, and imparted by the primary material 24 to the membrane 22. Such a dome shape at the first side 20a of the force transmitting member 20 may have similar benefits to those discussed above. In addition, a domed portion of the primary material 24 of the force transmitting member 20 may facilitate creating an air-tight (e.g., bubble free) boundary between the primary material 24 and the membrane 22 due to the primary material 24 applying a positive pressure to the membrane 22.

Figure 5:
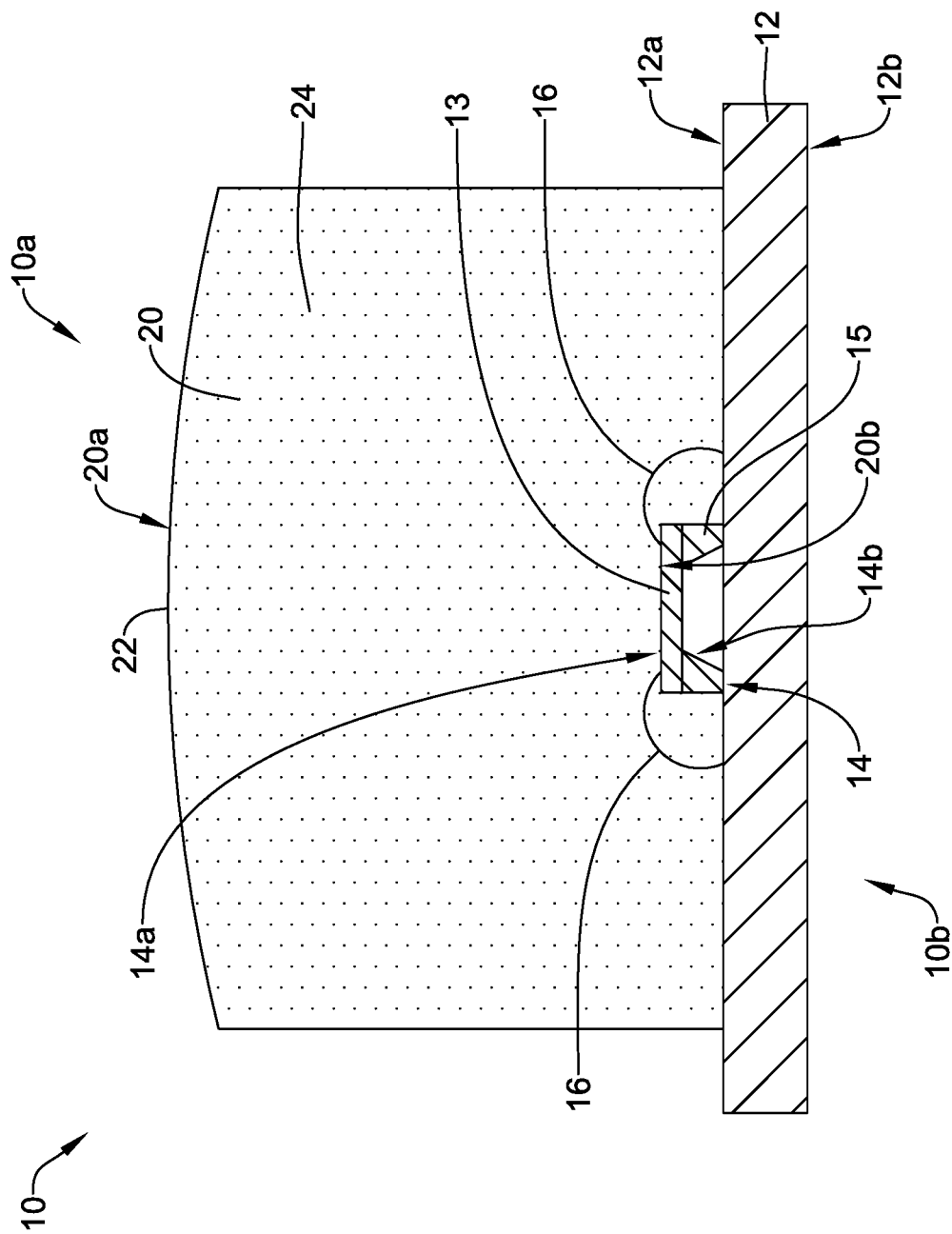
FIG. 5 is a schematic cross-section view of the illustrative sensor assembly of FIG. 1 with yet another illustrative force transmitting member.

FIG. 5 depicts a cross-section of the pressure sensor assembly 10 with the force transmitting member 20 formed from a single material, such as a cured silicone elastomer or other material, with the force transmitting member 20 configured to receive a force at the first side 20a and apply the received force to the first side 14a of the pressure sensor 14. In this case, the pressure sensor assembly 10 may not include the gel ring 18. Instead, the force transmitting member 20 may be formed by curing the silicone elastomer or other biocompatible material configured to transfer a force from the first side 20a to the second side 20b of the force transmitting member 20 in a mold or other from (e.g., an opening in a reservoir or other form) to give the force transmitting member 20 a desired shape. Although not depicted in FIG. 5, in some cases, the force transmitting member 20 may be formed from two or more materials and/or may include a membrane forming the first side 20a of the force transmitting member 20. Further, in some cases, the first side 20a of the force transmitting member 20 may be formed in a dome shape, as shown in FIG. 5, but this is not required in all cases.

The pressure sensors and/or pressure sensor assemblies (e.g., the pressure sensor assembly 10) disclosed herein may be used in one or more applications. For example, pressure sensors and/or pressure sensor assemblies, including those disclosed herein, may be used in medical applications, flight control applications, industrial process applications, combustion control applications, weather monitoring applications, water metering applications, as well as many other applications. In one example application, pressure sensors and/or pressure sensor assemblies may be used to directly sense pressure within a reservoir containing medicament for a patient. Although the pressure sensors and/or pressure sensor assemblies disclosed herein may be described primarily with respect to medicament-containing reservoirs, the pressure sensors and pressure sensor assemblies may be used in other applications as desired.

Patients with a disease or other medical issue may need to supplement their body with one or more medicaments (e.g., insulin, chemotherapy drugs, pain drugs, and/or other medicaments). Although medicaments may be provided via oral ingestion, shots, intravenous (IV) drips, and/or other techniques, patients are increasingly interested in portable and/or wearable pumps with which medicament may be self-administered. In some cases, portable and/or wearable pumps are or include components that are disposable (e.g., are meant to be disposed after a short time period or low number of uses (e.g., after one day, two days, three days, one week, one month or other time period and/or after a single use, after a reuse, after two reuses, after three reuses, after five reuses or after one or more other number of uses)) and meant to be replaced. Further, portable and/or wearable pumps may include a reservoir for holding medicament or other fluid, which may be disposed of with the portable and/or wearable pumps or may be disposed of separately from the portable and/or wearable pumps. Additionally or alternatively, portable and/or wearable pumps may be utilized for non-medical purposes.

Portable and wearable pumps may be configured to detect occlusion events, during which medicament or other fluid being outputted from a reservoir is blocked or partially blocked. The portable and wearable pumps may not use a dedicated pressure sensor to detect an occlusion event based on pressure in an interior of a reservoir, but instead may measure an electrical current that is applied to the pump's drive system. In some cases, where a motor is used to pump fluid out of a reservoir, a measurement of current draw by the motor may be utilized to approximate the pressure within a reservoir and identify when an occlusion event is taking place. This method, however, may lack reliability and may result in false positives whenever mechanical friction (e.g., when not caused by an occlusion) may resist the motion caused by the motor in a manner that cannot be distinguished from an occlusion event. This may be particularly problematic as portable and/or wearable pumps may ask a patient to replace the pump when an occlusion is detected and thus, false positive detection of occlusions may result in wasting pumps, reservoir components of pumps, medicament still in the pump, time, and/or other detriments.

Figure 6:
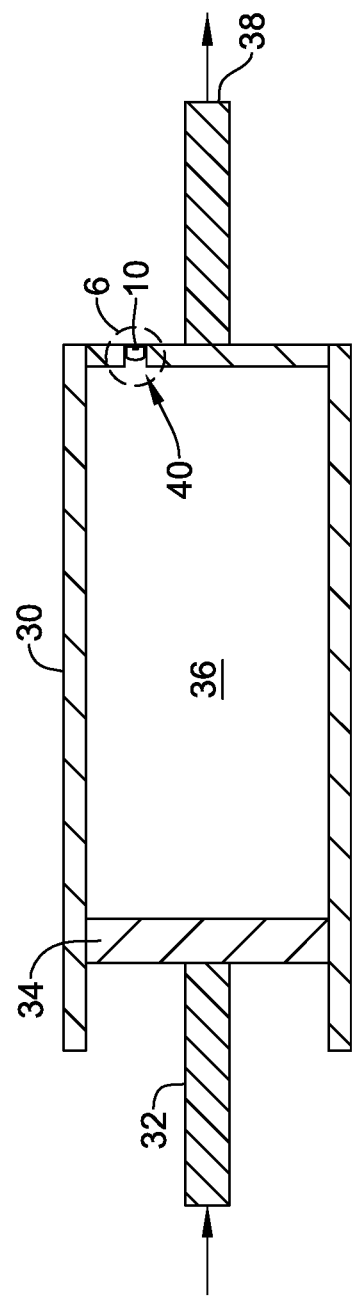
FIG. 6 is a schematic cross-section view of an illustrative reservoir including an illustrative pressure sensor assembly.

FIGS. 6-16 depict the pressure sensor assembly 10 in a medicament dispensing application. FIG. 6 depicts a cross-section of a reservoir 30 with a piston arm 32 of a medicament dispensing pump (not shown) driving a piston 34 down the reservoir 30. The reservoir 30 may include an interior 36 for receiving medicament and an outlet 38 for outputting medicament from the interior 36 as the piston 34 is advanced toward the outlet 38. In some cases, the reservoir 30 may include a port or opening 40 (e.g., a cavity) that may extend through a wall of the reservoir 30 between the ambient and the interior 36 of the reservoir. In some cases, the pressure sensor assembly 10 may be configured to be positioned within the opening 40 and secured therein.

The reservoir 30 may be formed from any material. For example, the reservoir 30 may be formed from one or more of polypropylene, glass, and/or other suitable material.

Figure 7:
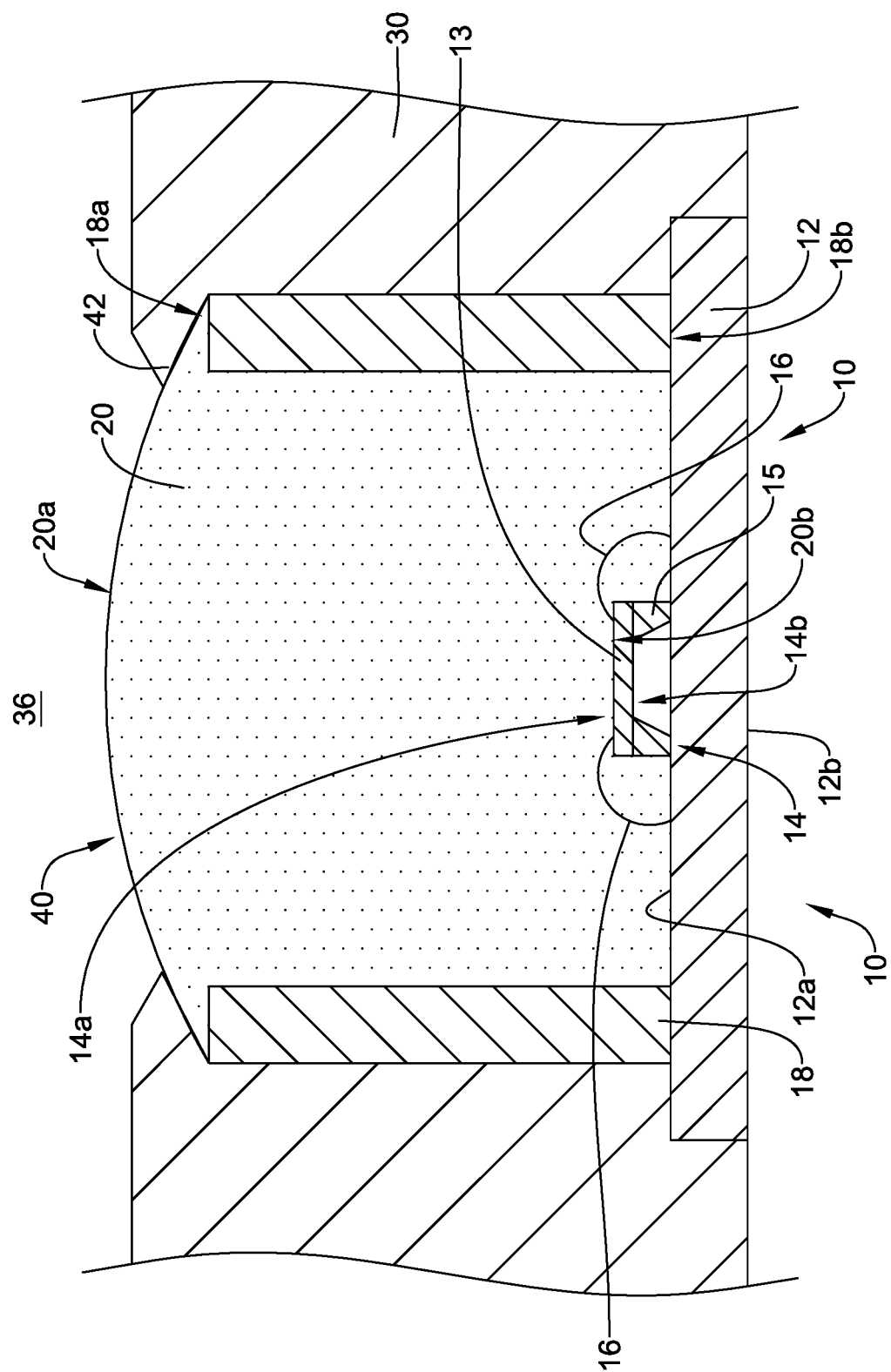
FIG. 7 is a schematic blown up view of circle 6 shown in FIG. 5.
Figure 8:
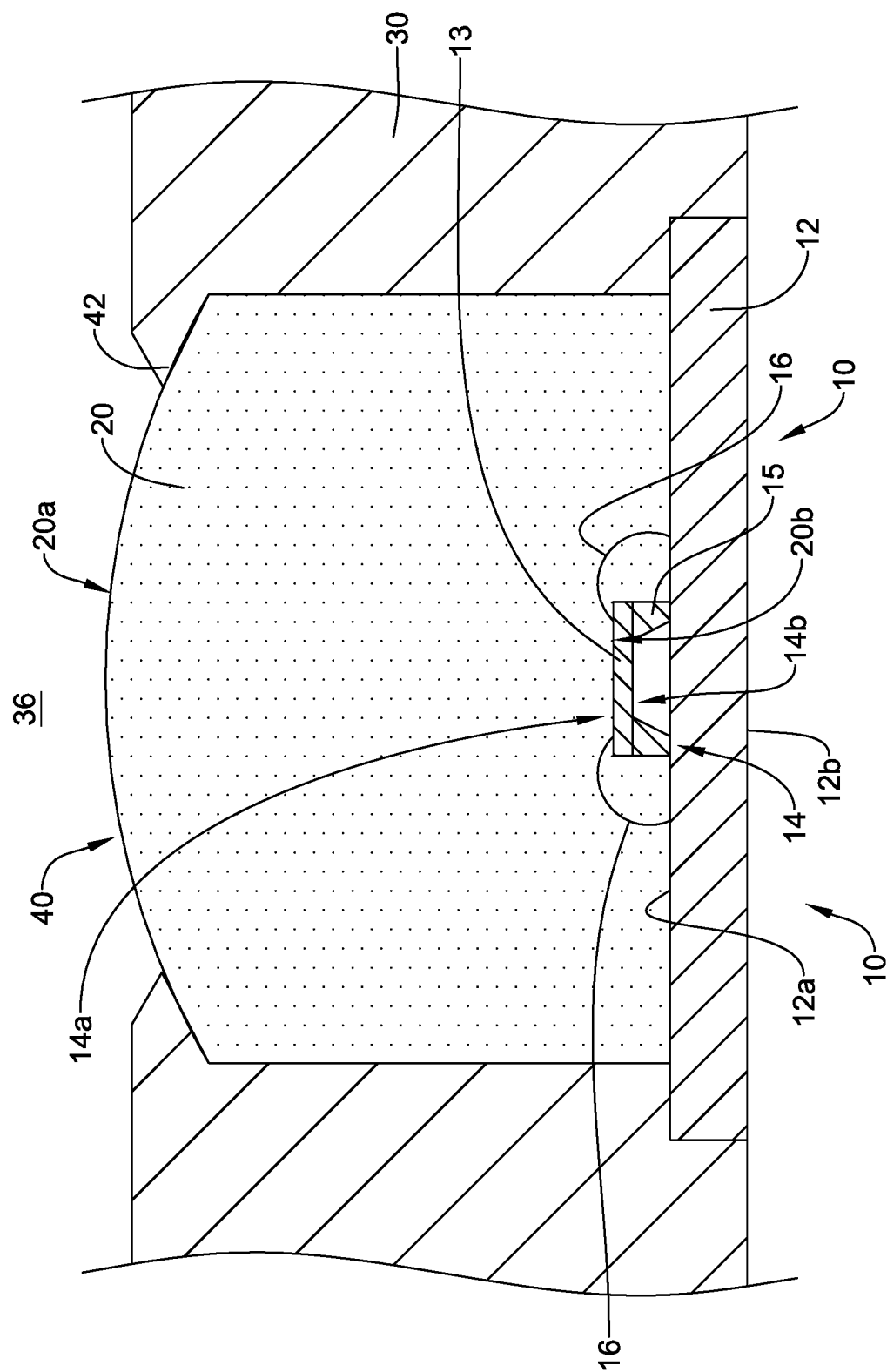
FIG. 8 is a schematic blown up view of circle 6 shown in FIG. 5 with another illustrative force transmitting member.

FIGS. 7 and 8 are magnified views of the interior of circle 6 shown in FIG. 6 with different pressure sensor assembly 10 configurations inserted into a wall of the reservoir 30.

FIG. 7 depicts a configuration of the pressure sensor assembly 10 having a gel ring 18 around the force transmitting member 20. FIG. 8 depicts a configuration of the pressure sensor assembly 10 without a gel ring 18 around the force transmitting member 20.

In FIGS. 7 and 8, the pressure sensor assembly 10 is shown inserted into the opening 40 of the reservoir 30 such that the first side 20a of the force transmitting member 20 is exposed to the interior 36 of the reservoir 30. In operation, fluid pressure within the interior 36 of the reservoir 30 may push or apply a pressure to the first side 20a of the force transmitting member 20 and the pressure acting on the first side 20a of the force transmitting member 20 may be transferred to the second side 20b of the force transmitting member 20 and thus to the pressure sensor 14. The force (e.g. pressure) applied to the pressure sensor 14 may be converted into an electrical signal and transferred from the pressure sensor 14 to the PCB 12 (e.g., via wire bonds 16 or other electrical connection) and onto a pump processor (e.g., a microprocessor or other processor, not shown). In some cases, the electrical signal from the pressure sensor 14 may be transmitted to the pump processor via a connector that mechanically and electrically engages pads on the PCB 12 (e.g., pads on one or more of the first side 12a and the second side 12b of the PCB 12). When so configured, the pressure sensor assembly 10 may be configured to directly sense a pressure within the interior 36 of the reservoir and the processor of the pump may be configured to identify an occlusion event separate from other mechanical failures of the pump or system.

In some cases, the reservoir 30 may include a feature defining the opening 40 that is configured to engage the pressure sensor assembly 10 to form a seal between the pressure sensor assembly 10 and the reservoir 30. As shown in FIG. 7, the reservoir 30 may include one or more extensions 42 that define the opening 40 and are configured to engage the first side 20a of the force transmitting member 20 to form a seal between the reservoir 30 and the pressure sensor assembly 10. In the examples of FIGS. 7 and 8, the extensions 42 may have an outermost edge having two angled surfaces at least partially defining the opening 40. One angled surface of the outermost edge of the extensions 42 may extend circumferentially around the opening 40 and may facilitate engaging a domed or other shaped structure of the force transmitting member 20 to form a seal as the first side of the dome or other shape may be angled along an angled edge of the first side 20a of the force transmitting member 20. Further, the other angled surface located at the outermost edge of the extension 42 and facing the interior 36 of the reservoir 30 may facilitate directing fluid in the reservoir 30 to the outlet 38 of the reservoir 30 and reducing trapping fluid at the opening 40. The domed or other shape of the first side 20a of the force transmitting member 20 may be configured to help reduce the amount of fluid that is in the opening 40. Some medicines can be very expensive, and reducing the amount of medicine that is trapped in the opening 40 can have benefits.

The angled surfaces of the outermost edge of the extension 42 and/or the opening 40 may take on one or more configurations other than what is shown in FIGS. 7 and 8. For example, manufacturability and/or creating a seal between the pressure sensor assembly 10 and the reservoir 30, among other considerations, may be considered when configuring the extensions 42 and/or the opening 40.

Figure 9:
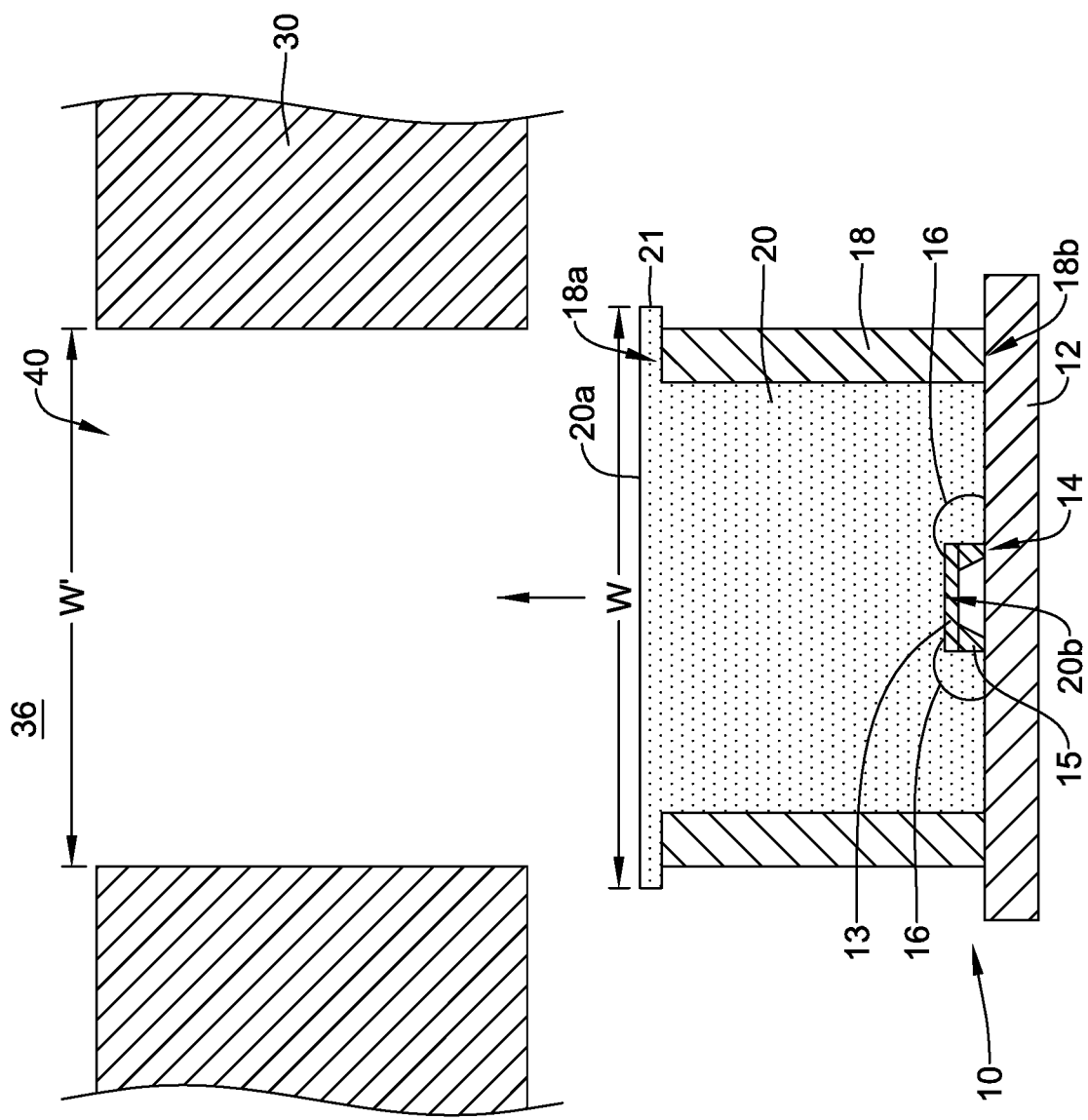
FIG. 9 is a schematic cross-section view of another illustrative pressure sensor assembly to be inserted into an opening of a reservoir.
Figure 10:
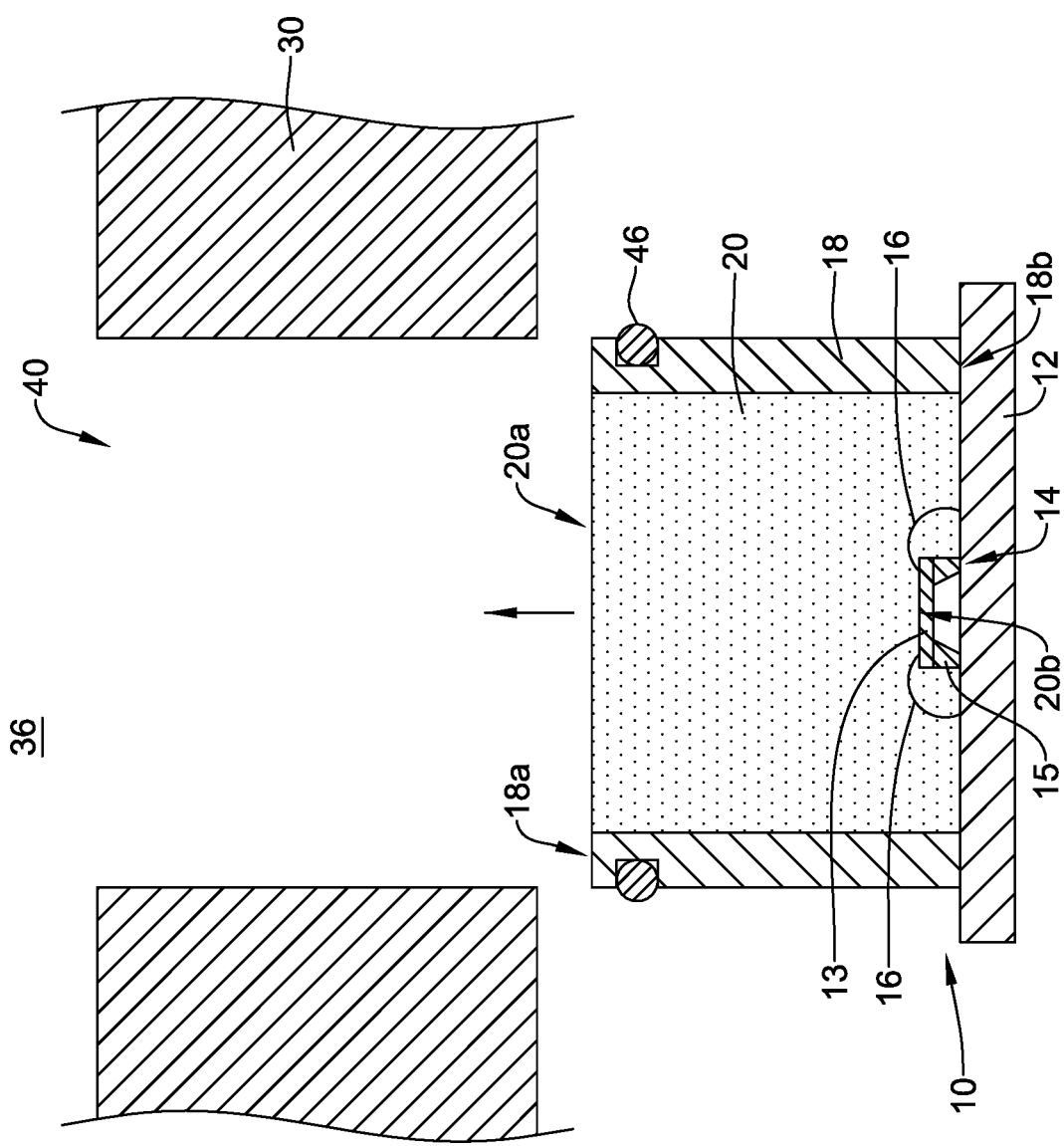
FIG. 10 is a schematic cross-section view of another illustrative pressure sensor assembly to be inserted into an opening of a reservoir.

FIGS. 9 and 10 depict different illustrative embodiments of the pressure sensor assembly 10 being inserted into an opening 40 of a reservoir 30. Although FIGS. 9 and 10 do not depict the extensions 42 defining the opening 40, the extensions 42 may be utilized to facilitate aligning the pressure sensor assembly 10 with an interior edge of the opening 40, but this is not required.

As is depicted in FIG. 9, a portion 21 of the force transmitting member 20 may overlap the first end 18a of the support ring 18 and/or extend radially outward from the support ring 18 and may have a width W. In some cases, the width W may be slightly wider than a diameter or width W' of the opening 40 in the reservoir 30, such that as the pressure sensor assembly 10 is inserted into the opening 40, the portion 21 of the force transmitting member 20 overlapping and/or extending radially outward from the support ring 18 may engage walls of the opening 40 and create a seal to seal the opening 40.

In operation, the pressure sensor assembly 10 may be advanced into the opening 40 until the first side 20a of the force transmitting member 20 is in-line or substantially in-line (e.g., where a dome, if present, of the force transmitting member 20 crosses or a portion of the force transmitting member 20 crosses) a surface of the reservoir 30 defining the interior 36 or to a different location along the opening 40. Positioning the first side 20a of the force transmitting member 20 in-line or substantially in-line with the interior surface of the reservoir may mitigate an amount of fluid that is trapped within the reservoir 30 around the pressure sensor assembly 10. Further, when extensions (e.g., extensions 42) are utilized for defining the opening 40, the force transmitting member 20 may include cut-outs or may be molded or otherwise configured to receive the extensions while allowing the first surface 20a of the force transmitting member 20 to be positioned at a desired location with respect to the interior 36 of the reservoir 30.

The portion 21 of the force transmitting member 20 that is configured to overlap and/or radially extend outward from the support ring 18 may be formed in one or more manners. In one example, a particular shape of the portion 21 of the force transmitting member 20 may be formed by a shape of a mold used to particularly shape and/or cure the force transmitting member 20. When some molding processes are used, the force transmitting member 20 may include flash that results from material leaking between two molds. This flash may be removed or left in place, as desired. In some cases, the portion 21 of the force transmitting member 20 may be created through deposit techniques (e.g., through a deposit technique when creating a dome of the force transmitting member 20) and/or one or more other techniques.

In addition to or as an alternative to the portion 21 of the force transmitting member 20 configured to overlap and/or extend radially outward from the support ring 18, the pressure sensor assembly 10 (as shown in FIG. 10) or the opening 40 may include an o-ring 46 configured to engage the support ring 18 and the wall of the opening 40. The o-ring 46 may be configured to engage the support ring 18 and/or other portion of the pressure sensor assembly 10 at any location along an exterior thereof. In some cases, it may be advantageous to have the o-ring 46 engage the support ring 18 and/or other portion of the pressure sensor assembly 10 at a location adjacent the interior 36 of the reservoir 30 to limit or mitigate an amount of fluid within the reservoir 30 that may become trapped at the pressure sensor assembly 10 (e.g., between the pressure sensor assembly 10 and the opening 40). In one example, as shown in FIG. 10, the o-ring 46 may be located and may engage the support ring 18 of the pressure sensor assembly 10 at a position adjacent the first end 18a of the support ring. In this example, when the pressure sensor assembly is inserted into the opening 40, the o-ring 46 may create a seal between the pressure sensor assembly 10 at a position adjacent the interior 36 of the reservoir 30.

In addition to, or as an alternative to, utilizing the o-ring 46 and/or the portion 21 of the force transmitting member 20, a gasket, an adhesive joint, or other type of seal may be used to create a seal between the pressure sensor assembly 10 and the opening 40 of the reservoir 30. These are just some examples.

Figure 11:
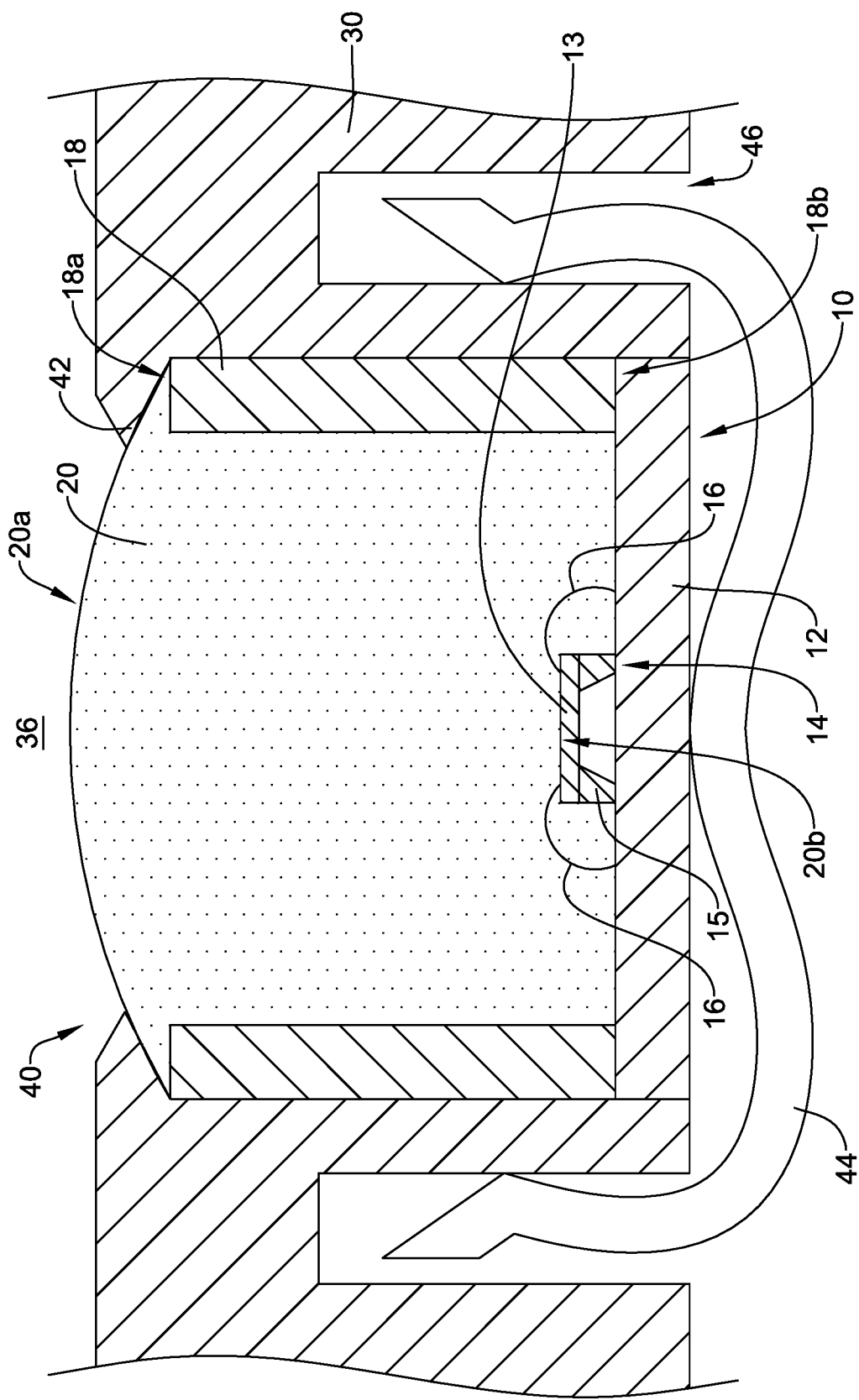
FIG. 11 is a schematic cross-section view of an illustrative pressure sensor assembly within a reservoir secured via a clip.

FIG. 11 depicts a clip 44 (e.g., a resilient clip) configured to secure the pressure sensor assembly 10 within the opening 40 of the reservoir 30. Once the pressure sensor assembly 10 has been inserted into the opening 40, and in some cases, the clip 44 may be applied to the pressure sensor assembly 10 and the reservoir 30 to secure the pressure sensor assembly 10 within the opening 40. In the example of FIG. 11, the clip 44 may apply a force on the PCB 12 of the pressure sensor assembly 10 and push the pressure sensor assembly 10 against the extension 42 or other portion of the reservoir 30 defining the opening 40. In the example shown, ends of the clip 44 may extend into one or more openings 40 defined in an exterior surface of the reservoir to secure the clip 44 to the reservoir. In some cases, the clip 44 may be formed from a metallic material. In some cases, the clip 44 may conduct electrical signals from the PCB 12 to an electrical contact in the reservoir 30 or the pump to facilitate sending pressure readings from the pressure sensor assembly 10 to the processor of the pump. Alternatively or in addition, the clip 44 may be formed from a polymer and/or one or more other materials.

Although FIG. 11 depicts the clip 44 as an M-shaped clip, the clip 44 may be any type of clip configured to secure (e.g., permanently or removably secure) the pressure sensor assembly 10 within the opening 40 and to the reservoir 30. Further, one or more other mechanisms may be utilized for securing the pressure sensor assembly 10 to the reservoir 30 including, but not limited to, adhesives, a cover, a threaded connection, a bayonet connection, and/or other securing technique.

FIGS. 12-16 depict the pressure sensor assembly 10 useful in a medicament dispensing application, as well as other applications. As shown in FIGS. 12-16, the pressure sensor assembly 10 may be configured to be positioned within an opening 40 (sometimes defined by a reservoir 30) to at least partially define a cavity 52. In some cases, the cavity 52 may be at least partially defined by the pressure sensor assembly 10, a membrane 50, a side wall 54, and/or one or more other features. In some cases, the side wall 54 may engage the pressure sensor assembly 10 (e.g., the PCB 12 or other portion of the pressure sensor assembly 10) and may extend entirely or at least partially around a perimeter of the pressure sensor (e.g., pressure sensor 14) of the pressure sensor assembly 10.

The membrane 50 may be configured in any manner and may be part of and/or may form part of the reservoir 30, or may be separate from the reservoir 30. In some cases, the membrane 50 may have a first side in communication with the cavity 52 and a second side in communication with an interior 36 of the reservoir 30. In some cases, the membrane 50 may be dome shaped (e.g., a convex shape similar to the membrane 22 in FIG. 4) to facilitate sensing forces in the interior 36 of the reservoir 30 and/or for other purposes. In some cases, a gel or liquid (e.g., a non-compressible gel or liquid as discussed herein) may be provided in the cavity 52, and may provide a positive pressure or force on the membrane 50 to cause the membrane 50 to form the convex dome shape. The membrane 50 may have a thickness between the cavity 52 and the interior 36 that allows the membrane 50 to deflect in response to pressures and/or forces applied on the membrane 50 from the interior 36 of the reservoir 30.

The membrane 50 may be formed from any material configured to deflect in response to pressures and/or forces applied on the membrane 50 from the interior 36 of the reservoir 30. In some cases, the membrane may be formed of and/or comprise one or more of a non-compressible polymeric material including, but not limited to, a cured silicone rubber. The membrane may be formed from a biocompatible material.

In the configurations of FIGS. 12-16, the pressure sensor assembly 10 may be affixed or otherwise connected (e.g., with a clip, adhesive, etc.) to the reservoir 30. One or more through-holes may be provided between the cavity 52 and the ambient to facilitate inserting a fluid into the cavity 52 to form the force transmitting member 20 between the membrane 50 and the pressure sensor 14. As discussed in greater detail below, the one or more through-holes may include one or more fill-holes and/or one or more exhaust-holes.

Figure 12:
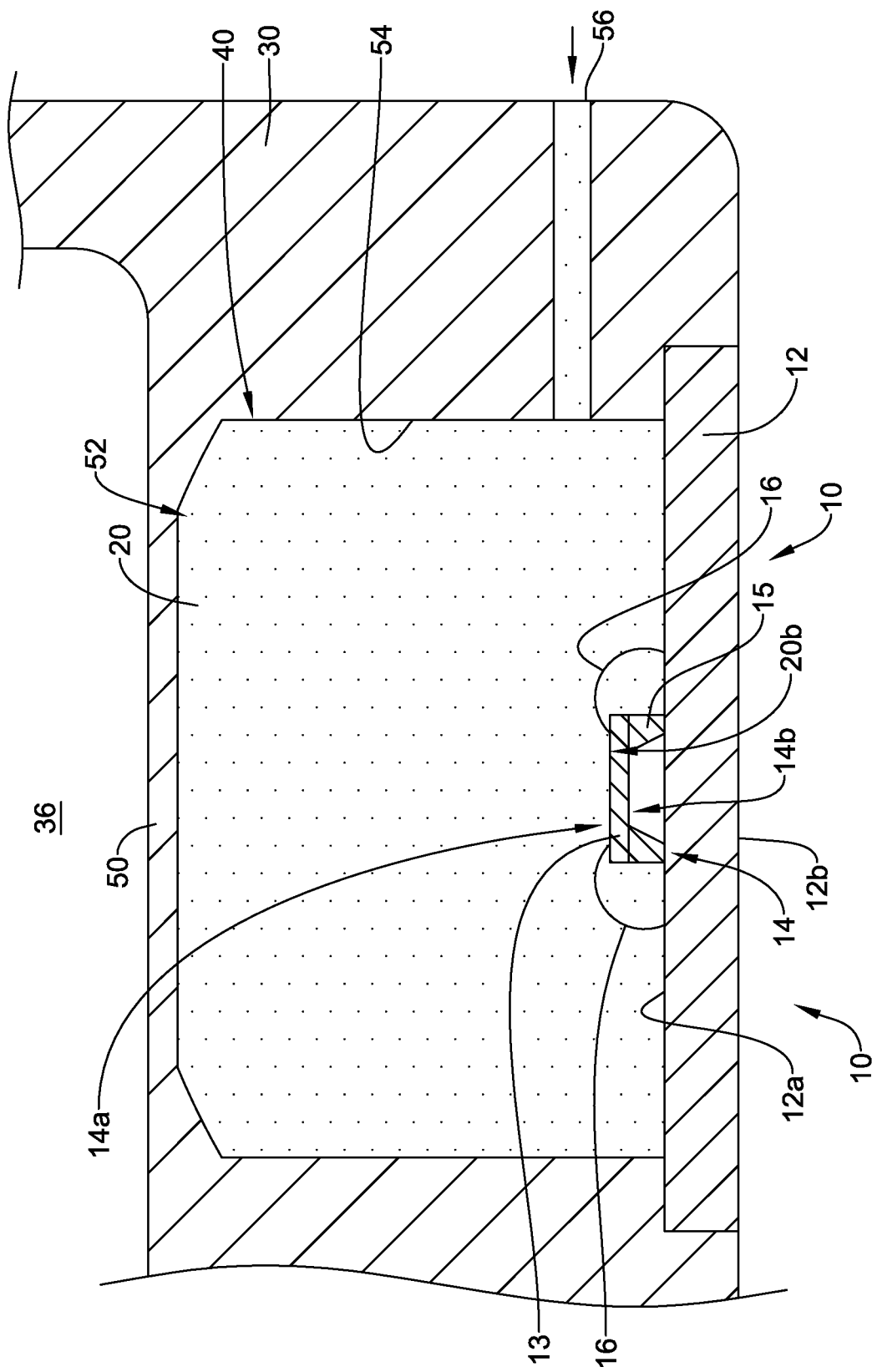
FIG. 12 is a schematic cross-section view of an illustrative pressure sensor assembly having a through-hole extending into a pressure sensor cavity.

As shown in FIG. 12, a single hole is provided and may be a fill-hole 56 facilitating insertion of a fluid into the cavity 52. The fill-hole 56 depicted in FIG. 12 may extend through the reservoir 30, as shown in FIG. 12, but this is not required. In some cases, one or more fill holes may extend through the PCB 12 (e.g. see FIGS. 17-18) and/or other portion of the pressure sensor assembly 10. Further, although the fill-hole 56 is depicted in FIG. 12 as being in a particular location relative to the reservoir 30 and the pressure sensor assembly 10, the fill-hole 56 may be located at any suitable location for filling the cavity 52.

When a single fill-hole 56 is provided, the fill-hole 56 may function as both the fill-hole and an exhaust-hole. Alternatively, or in addition, the cavity 52 may be filled under vacuum pressure to help ensure gas is not trapped within the cavity 52. For example, a vacuum pressure may be applied to the reservoir 30 and the pressure sensor assembly 10 to remove all gas from the cavity 52 and a fluid maybe inserted into the cavity 52. Once the fluid has been inserted into the cavity 52 and, optionally, the fill-hole 56, the fluid may be cured to form the force transmitting member 20 that transfers forces acting on the membrane 50 to the pressure sensor assembly 14. When fluid is inserted into the fill-hole 56 and cured, the cured fluid may act as and/or form a plug for the fill-hole 56 to help ensure material in the cavity 52 does not exit the cavity through the fill-hole 56.

The fill-hole 56 and/or other through-holes of the reservoir 30 and/or the pressure sensor assembly 10 may have any suitable dimensions. In some cases, the fill-hole 56 may have a maximum lateral dimension (e.g., diameter or other lateral dimension) and a length dimension, wherein the length dimension is at least four (4) times as long as the maximum lateral dimension, but this is not required. Such a ratio of length dimension to maximum lateral dimension may help ensure that the force transmitting member 20 is transferring nearly all force or pressure applied on the membrane 50 to the pressure sensor 14 by limiting or preventing such forces from dissipating through material in the fill-hole 56. Other dimensions and configurations for the fill-holes 56 and/or other through-holes of the reservoir 30 and/or the pressure sensor assembly 10 are contemplated.

Figure 13:
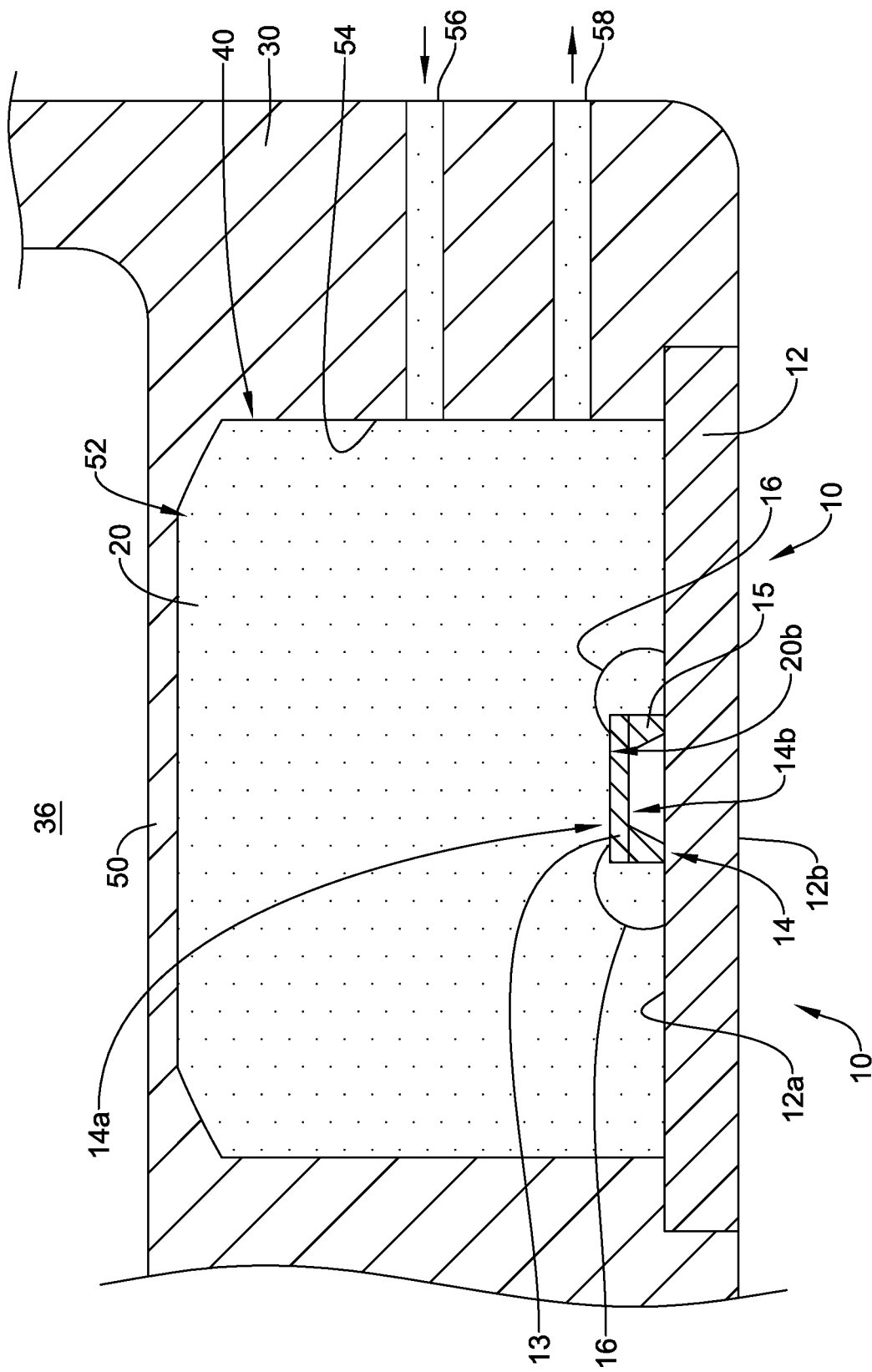
FIG. 13 is a schematic cross-section view of an illustrative pressure sensor assembly having two through-holes extending into a pressure sensor cavity.

As shown in FIG. 13, two through-holes are provided and may include a fill-hole 56 facilitating insertion of a fluid into the cavity 52 and an exhaust-hole 58 facilitating removal of gas from the cavity 52 as the fluid is inserted into the cavity. The fill-hole 56 and the exhaust-hole 58 depicted in FIG. 13 may extend through the reservoir 30, as shown in FIG. 13, but this is not required. In some cases, one or more fill holes and/or one or more exhaust-holes may extend through the PCB 12 (e.g., see FIGS. 17 and 18) and/or other portions of the pressure sensor assembly 10. Further, although the fill-hole 56 and the exhaust-hole 58 are depicted in FIG. 12 as being in a particular location relative to the reservoir 30 and the pressure sensor assembly 10, the fill-hole 56 and the exhaust-hole 58 may be located at any location suitable for filling the cavity 52 with fluid and exhausting gas from the cavity 52 before and/or while filling the cavity 52.

When at least a first through-hole (e.g., the fill-hole 56) and a second through-hole (e.g., the exhaust-hole 58) are provided, the cavity 52 may be filled under vacuum pressure, under an ambient pressure, and/or under a different pressure. Having a second hole or exhaust-hole 58 may facilitate removing gas from the cavity 52, as discussed above, such that the cavity 52 does not need to be filled under a vacuum pressure environment to ensure gas is not trapped within the cavity 52. For example, as fluid is inserted through the fill-hole 56, gas will naturally escape out of the cavity 52 due to increased pressures in the cavity such that all gas is removed from the cavity once it is filled with a gel or liquid. In some cases, once the fluid has been inserted into the cavity 52 and, optionally, the fill-hole 56 and/or the exhaust-hole 58, the fluid may be cured to form the force transmitting member 20 that transfers forces acting on the membrane 50 to the pressure sensor assembly 14. When fluid is inserted into the fill-hole 56 and/or the exhaust-hole 58 and cured, the cured fluid may act as and/or form a plug for the fill-hole 56 and/or the exhaust-hole 58 to help ensure material in the cavity 52 does not exit the cavity through the fill hole 56 and/or the exhaust-hole 58.

The exhaust-hole 58 and/or other through-holes of the reservoir 30 and/or the pressure sensor assembly 10, like the fill-hole 56 discussed above, may have suitable dimensions. In some cases, the exhaust-hole 58 may have a maximum lateral dimension (e.g., diameter or other lateral dimension) and a length dimension that is at least four (4) times as long as the maximum lateral dimension, but this is not required. Such a ratio of length dimension to maximum lateral dimension may help ensure the force transmitting member 20 is transferring nearly all force or pressure applied to the membrane 50 to the pressure sensor 14. Other dimensions and configurations for the exhaust-holes 58 and/or other holes of the reservoir 30 and/or the pressure sensor assembly 10 are contemplated.

The fill-hole 56 and the exhaust-hole 58 may have any suitable minimum lateral dimension configured to facilitate filling the cavity 52 with a gel or liquid material. In one example, the fill-hole 56 and/or the exhaust-hole 58 may have a minimum lateral dimension on the order of a 0.5 millimeters. Other dimensions are contemplated. In some cases, the fill-hole 56 and the exhaust-hole 58 may have a same or a substantially similar minimum lateral dimension such that gas may exit the cavity 52 through the exhaust-hole 58 at least as fast as fluid may enter the cavity 52 through the fill-hole 56. Alternatively, a sum of a minimum lateral dimension of multiple fill-holes 56 and/or exhaust-holes 58 may equal or substantially equal a sum of minimum lateral dimensions of one or more of the other of the exhaust-hole 58 and the fill-hole 56, but this is not required.

Figure 14:
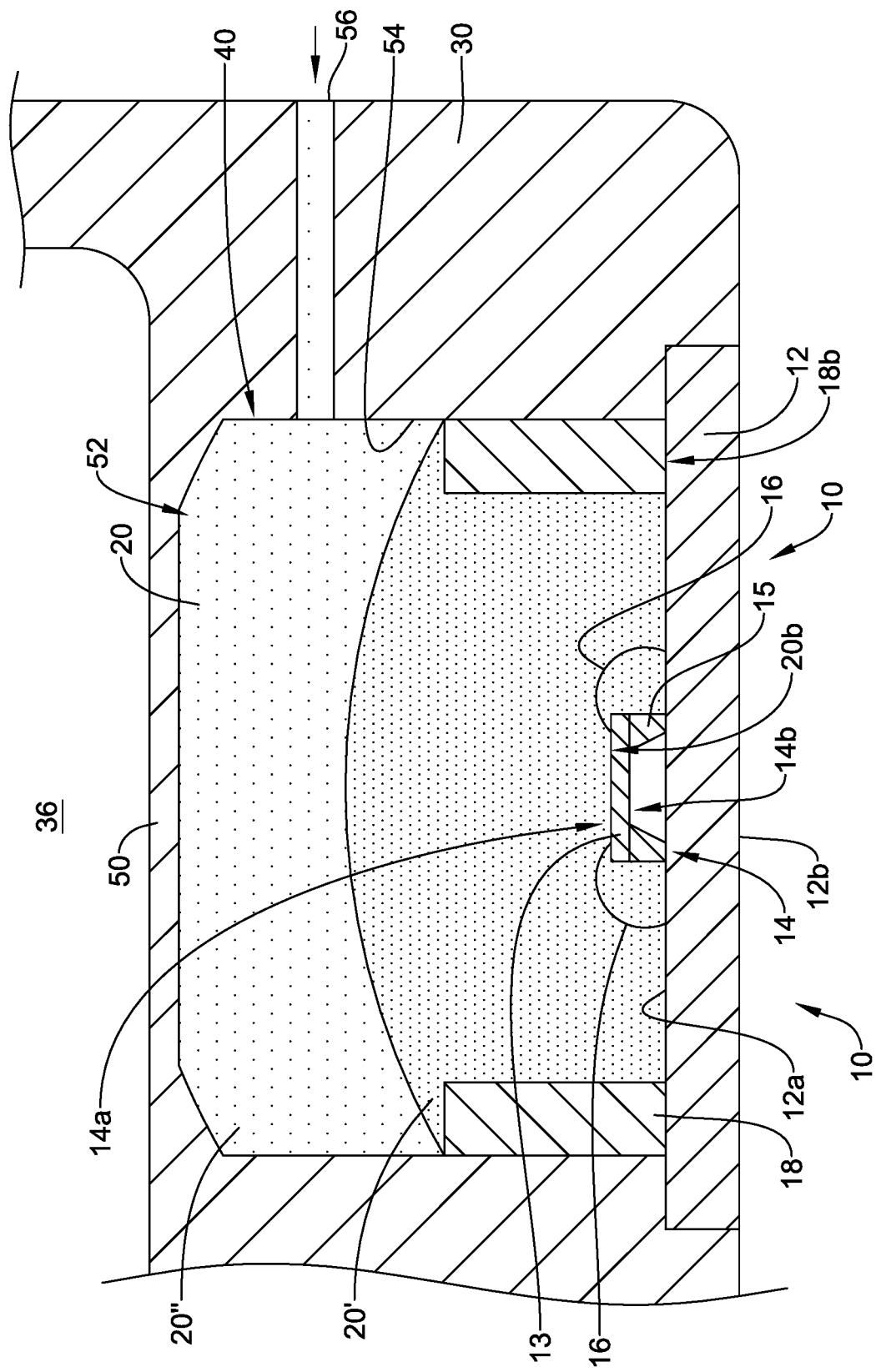
FIG. 14 is a schematic cross-section view of another illustrative pressure sensor assembly having a through-hole extending into a pressure sensor cavity.

In some cases, a pressure sensor assembly 10 may have a support ring 18 and a first material 20' inserted therein may be provided in the cavity 52, as shown in FIG. 14. The support ring 18, when provided, may be considered part of the side wall 54 defining the cavity 52. In the configuration of FIG. 14, the remaining cavity 52 may be at least partially defined by the first material 20', the membrane 50, and the side wall 54. Further, a fill-hole 56 may extend between the ambient and the cavity 52 to facilitate inserting a second material 20" into the cavity 52 as shown. While the use of a first material 20' and a second material 20" are shown in FIG. 14, it is contemplated that just one material type may fill the entire cavity 52 (including that defined by the support ring 18). Alternatively, it is contemplated that three or more layers of similar or different materials may be used to fill the cavity 52.

The support ring 18 and a shape of the first material 20' may take on any shape and/or size configured to facilitate transferring forces between the membrane 50 and the pressure sensor 14 when the second material 20" has been inserted into the cavity 52 and cured. The support ring 18 may extend all of the way between the PCB 12 to the membrane 50, or the support ring 18 may extend from the PCB 12 to a location spaced from the PCB 12 but short of the membrane 50, as depicted in FIG. 14. Further, in some cases, the first material 20' may have an interface with the second material 20" that may be domed to reduce trapped gas bubbles between the first material 20' and the second material 20" and/or otherwise facilitate transferring a force or pressure acting on the membrane 50 to the pressure sensor 14.

Figure 15:
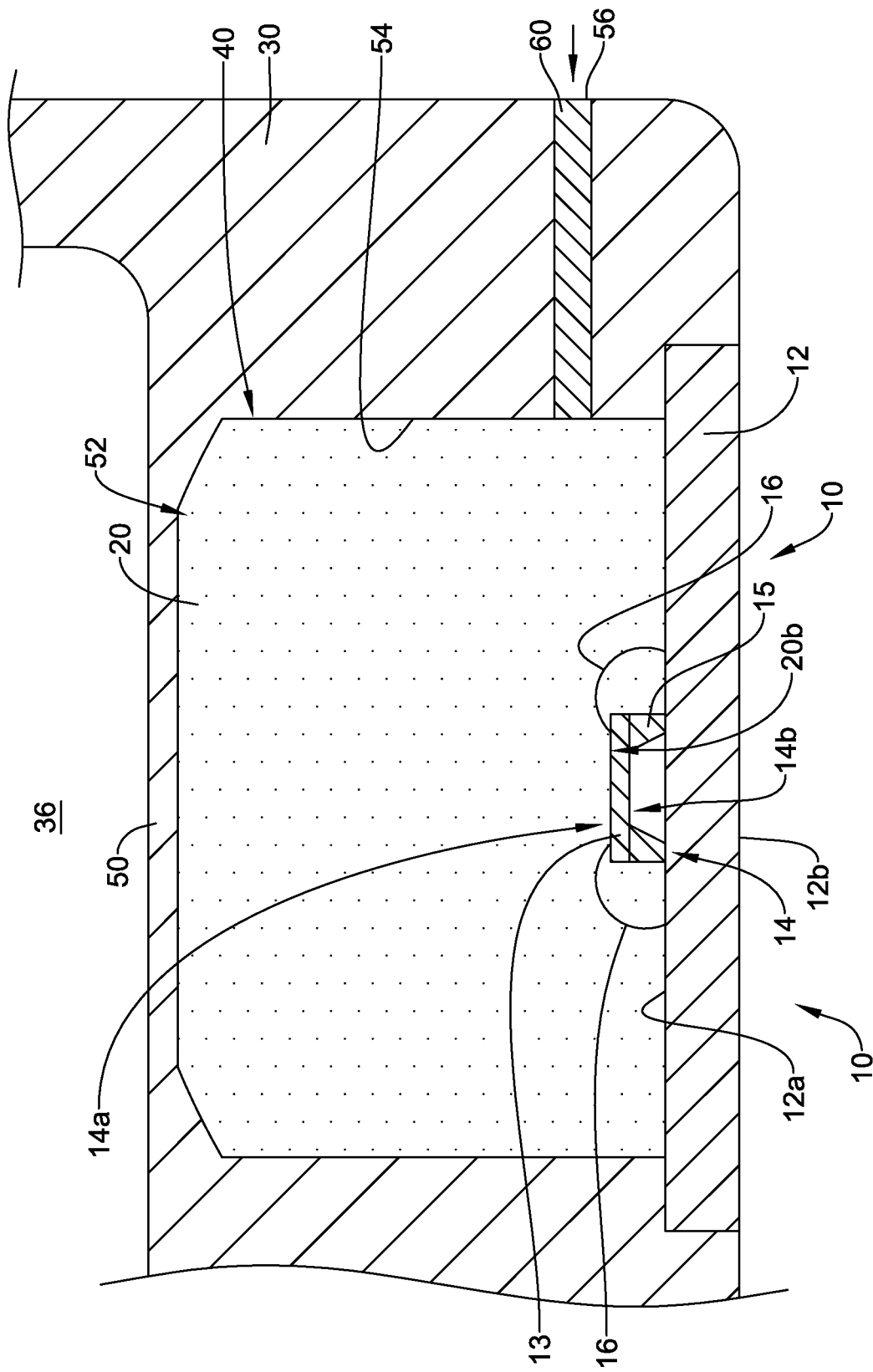
FIG. 15 is a schematic cross-section view of an illustrative pressure sensor assembly having a plug inserted into a through-hole extending into a pressure sensor cavity.

FIG. 15 depicts a pressure sensor assembly 10 including a membrane similar to that shown in FIG. 12. The assembly of FIG. 15, however, depicts a plug 60 inserted into the fill-hole 56 to prevent material inserted into the cavity 52 from leaking out of the cavity through the fill-hole 56 and/or helps ensure the force transmitting member 20 nearly fully transmits forces and/or pressures acting on the membrane 50 to the pressure sensor 14. Although the plug 60 is depicted in FIG. 15 as inserted in the fill-hole 56, a plug 60 may be utilized in any other fill-hole 56 and/or one or more exhaust-holes 58. The plug 60 may be particular useful when the liquid or gel that is inserted into the cavity 52 is not cured once in the cavity 52, but rather remains a liquid or gel that could flow out of the fill-hole 56. For example, the liquid or gel may be a non-compressible gel such as a fluoro-silicone gel, a non-compressible oil, or other suitable gel or liquid material. The plug 60 may be any suitable material and may have any suitable configuration including being formed from one or more component parts. In some case, the plug 60 may be made of a pre-made hard and/or stiff material sized to fill at least part of the fill-hole 56 and/or the exhaust-hole 58.

In some cases, even when the liquid or gel that is inserted into the cavity 52 is cured, it may be desirable to include a plug to help prevent forces applied to the membrane 50 from being diverted down the fill-hole 56. When so provided, the plug 60 may be made from a stiff material (e.g. plastic, metal or the like) so as to not absorbed force applied to cavity by the membrane 50. Alternatively or in addition, the plug 60 may be made of a gel or liquid material and cured to form a hard and/or stiff material that facilitates preventing forces applied to the membrane 50 from being absorbed by the plug 60. When the plug 60 is formed of a cured gel or liquid material, the gel or liquid may be inserted into the fill-hole 56 after the material of the force transmitting member 20 is cured, but this is not necessarily required. When the fill-hole 56 and/or the exhaust-hole 58 are plugged with a hard or stiff plug, the length to maximum lateral dimension ratio may be less than about four (4).

Figure 16:
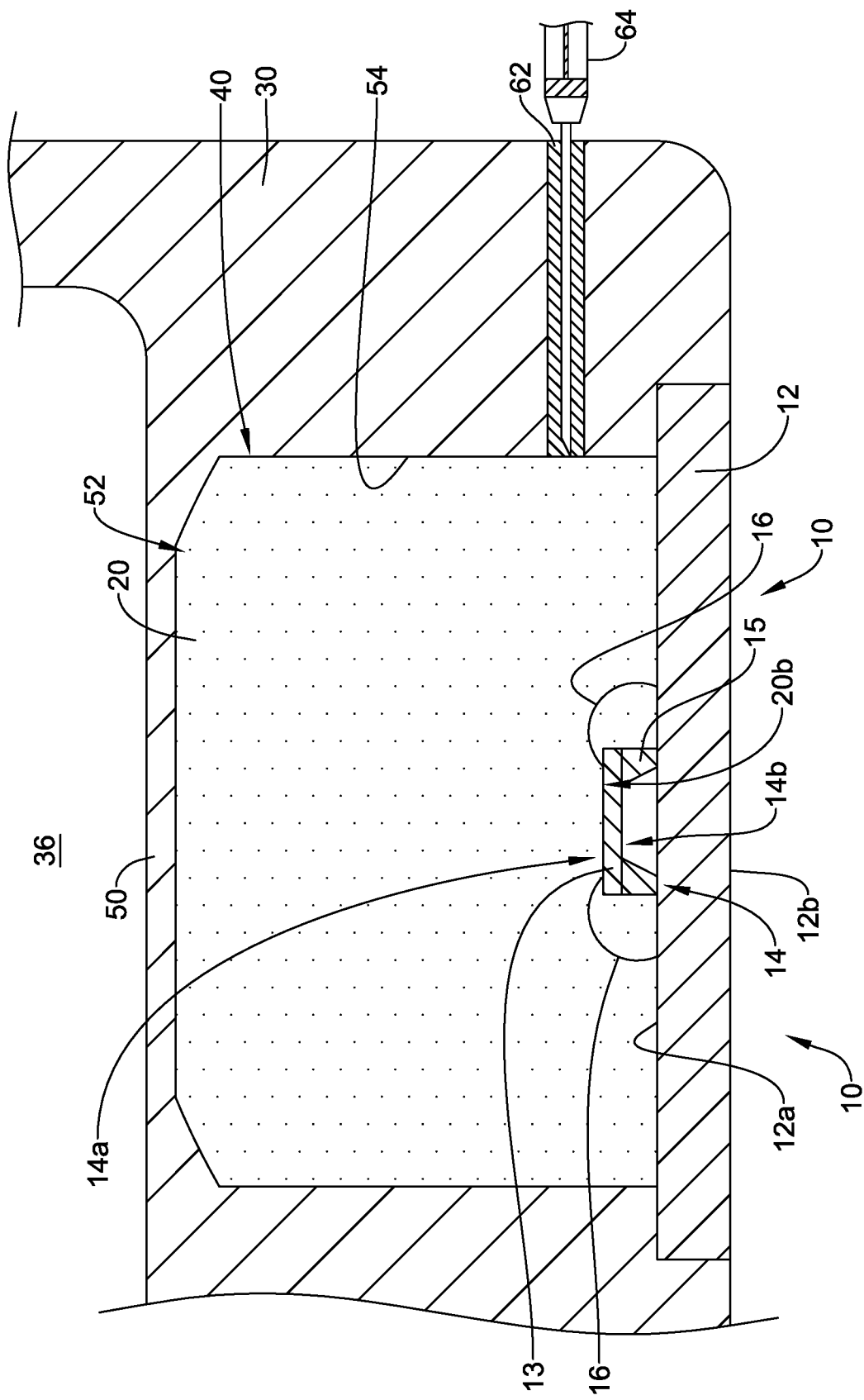
FIG. 16 is a schematic cross-section view of an illustrative pressure sensor assembly having a needle septum situated in or across a through-hole that extends into a pressure sensor cavity.

In some case, a sidewall 54, the PCB 12, and/or other portions of the pressure sensor assembly 10 may be formed from a pierceable material and/or may include a septum 62 formed of a pierceable material, as shown in FIG. 16, that facilitates receiving a needle of a syringe 64 configured to provide a gel or liquid material to the cavity 52 to form the force transmitting member 20. The pierceable material that facilitates receiving a syringe may be a material that is capable of being punctured by the needle of the syringe 64 and then re-seals once the needle of the syringe 64 is removed and/or withdrawn from the pierceable material. Although the pierceable material may re-seal on its own once the needle of the syringe is removed, the pierceable material may re-seal during or in response to a curing of the material inserted into the cavity 52 (e.g., the pierceable material may re-flow in response to the curing process and thus, reseal the area where the needle pierced the pierceable material). Further, in some cases, the pierceable material may be hard and/or stiff to facilitate preventing forces applied to the membrane 50 from being absorbed by the pierceable material. One example pierceable material may be polypropylene, although use of any suitable pierceable material is contemplated.

Figure 17:
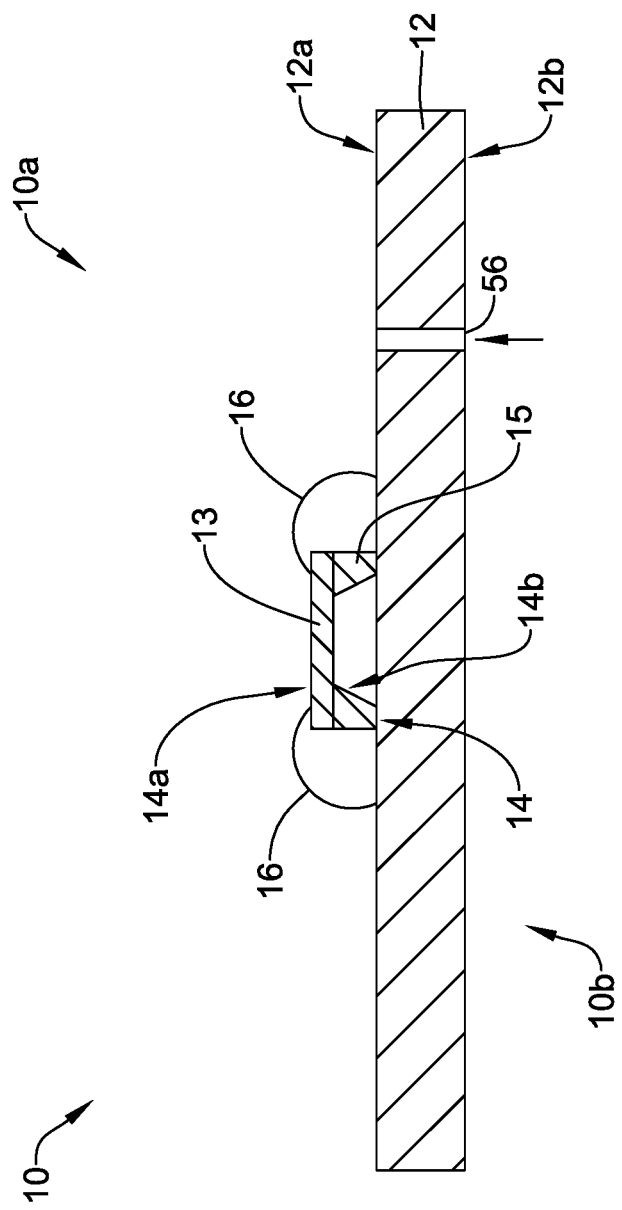
FIG. 17 is a schematic cross-section view of an illustrative pressure sensor assembly having a through-hole extending through a printed circuit board and into a pressure sensor cavity.
Figure 18:
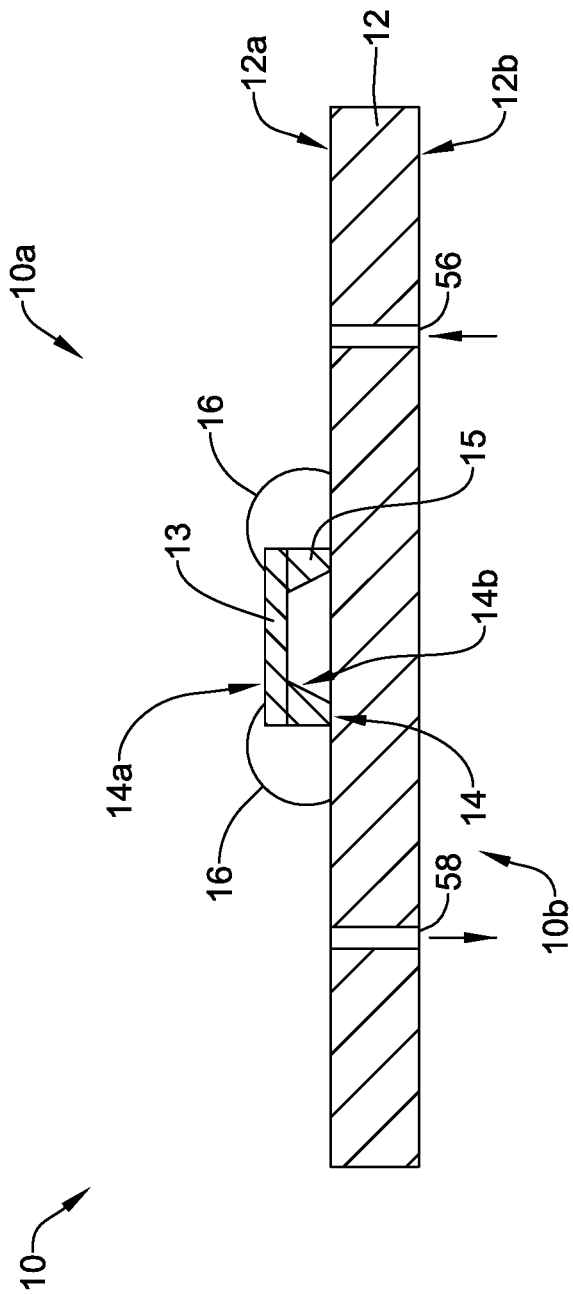
FIG. 18 is a schematic cross-section view of an illustrative pressure sensor assembly having two through-holes extending through a printed circuit board and into a pressure sensor cavity.

FIGS. 17 and 18 depict pressure sensor assemblies 10 with one or more through-holes extending through the PCB 12, where the pressure sensor assemblies 10 having the one or more through-holes may be connected to a reservoir 30 or the like in the manner discussed herein and/or in other manners. In some cases, the pressure sensor assembly 10 may include one or more fill-holes 56 and one or more exhaust-holes 58.

FIG. 17 depicts a single hole, which may be a fill-hole 56 configured to extend between the ambient and the cavity 52 between the pressure sensor assembly 10 and the membrane 50. In operation, the fill-hole 56 in the pressure sensor assembly 10 of FIG. 17 may be configured and/or utilized in a manner similar to the fill-hole 56 of FIGS. 12-16.

FIG. 18 depicts two through-holes extending through the PCB 12, with one of the through-holes being a fill-hole 56 and a second of the through-holes being an exhaust-hole 58. The fill hole 56 and the exhaust-hole 58 may be configured to extend between the ambient and the cavity 52 between the pressure sensor assembly 10 and the membrane 50. In operation, the fill-hole 56 and the exhaust-hole 58 in the pressure sensor assembly 10 of FIG. 18 may be configured and/or utilized in a manner similar to the fill-hole 56 and/or exhaust-hole 58 of FIG. 13.

Figure 19:
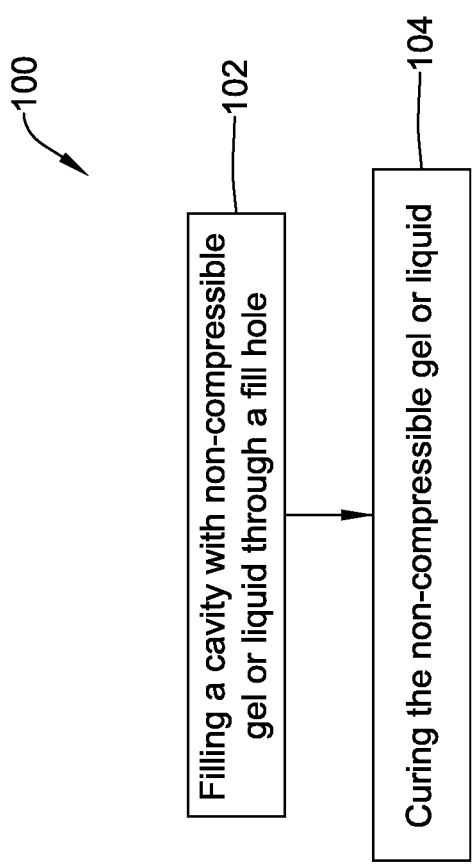
FIG. 19 is a schematic flow diagram of an illustrative method of making a pressure sensor assembly.

FIG. 19 depicts a method 100 of making a pressure sensor assembly (e.g., the pressure sensor assembly 10 or other pressure sensor assembly), wherein the pressure senor assembly may include a cavity (e.g., the cavity 52 or other cavity) defined in part by a membrane (e.g., the membrane 50 or other membrane) and configured such that a pressure sensor (e.g., the pressure sensor 14 or other pressure sensor) may be exposed to the cavity and/or a fill-hole (e.g., the fill-hole 56 or other fill-hole) may extend into the cavity. In one example, the method 100 may include filling 102 the cavity with a non-compressible gel or liquid through the fill-hole, and then curing 104 the non-compressible gel or liquid. In some cases, curing of the non-compressible gel or liquid may result in forming or forming part of a force transmitting member between the membrane and pressure sensor.

In some instances, the pressure sensor assembly may be inserted into an opening of a reservoir (e.g., the reservoir 30 or other reservoir) to define the cavity between the pressure sensor assembly and a membrane (e.g., a membrane of the reservoir or other membrane). In some cases, the membrane may be part of or form part of a reservoir. When so provided, the membrane may have a first side exposed to the cavity and a second side exposed to an interior of the reservoir. Alternatively, the membrane may be separate from the reservoir.

The step of filling 102 the cavity with a non-compressible gel or liquid through the fill-hole may include inserting fluid into the cavity via a through-hole that extends through one or both of a printed circuit board (e.g., PCB 12 or other printed circuit board) of the pressure sensor assembly and a wall of the reservoir. In some cases, as fluid is inserted into the cavity through the fill-hole, gas may exhaust out of the cavity through the fill-hole and/or a separate exhaust-hole (e.g., the exhaust-hole 58 or other exhaust-hole). Alternatively or in addition, the fluid may be inserted into the cavity through a fill-hole while the assembly is under a vacuum pressure and as such, all or substantially all gas in the cavity may be evacuated prior to and/or during the insertion of fluid into the cavity.

Having thus described several illustrative embodiments of the present disclosure, those of skill in the art will readily appreciate that yet other embodiments may be made and used within the scope of the claims hereto attached. It will be understood that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A pressure sensor assembly comprising:
a substrate having a front side and a back side;
a pressure sensor having a front side and a back side, the pressure sensor mounted to the substrate with the back side of the pressure sensor facing the front side of the substrate;
a side wall engaging the front side of the substrate, the side wall extending around a perimeter of the pressure sensor;
a membrane;
the membrane, the side wall and the substrate defining a cavity;
the pressure sensor assembly configured to have a non-compressible gel or liquid in the cavity, wherein the front side of the pressure sensor is configured to be exposed to the non-compressible gel or liquid; and
a fill hole extending into the cavity through which the cavity is configured to be filled with the non-compressible gel or liquid, wherein the cavity is defined at least in part by a septum that is configured to allow a needle to:
pierce the septum;
fill the cavity with the non-compressible gel or liquid; and
reseal once the needle has been withdrawn from the septum.

2. The pressure sensor assembly of claim 1, wherein the substrate comprises a printed circuit board, and the fill hole extends through the printed circuit board and into the cavity.

3. The pressure sensor assembly of claim 1, wherein the fill hole extends through at least part of the side wall and into the cavity.

4. The pressure sensor assembly of claim 1, wherein at least part of the side wall is formed by a reservoir that defines an interior cavity for receiving a medicament, and wherein the membrane is exposed to the interior cavity of the reservoir.

5. The pressure sensor assembly of claim 4, wherein the fill hole extends through at least part of the reservoir and into the cavity.

6. The pressure sensor assembly of claim 1, wherein the membrane comprises a non-compressible polymeric material.

7. The pressure sensor assembly of claim 6, wherein the membrane comprises a cured silicone elastomer.

8. The pressure sensor assembly of claim 1, wherein the membrane has a convex dome shape facing away from the pressure sensor.

9. The pressure sensor assembly of claim 8, wherein the non-compressible gel or liquid in the cavity applies a positive pressure to the membrane to cause the membrane to assume the convex dome shape.

10. The pressure sensor assembly of claim 1, wherein the fill hole has a maximum lateral dimension and a length, and wherein the length is at least four times as long as the maximum lateral dimension.

11. The pressure sensor assembly of claim 1, further comprising an exhaust hole extending out of the cavity, wherein the exhaust hole is configured to exhaust gas from the cavity as the cavity is filled with the non-compressible gel or liquid.

12. The pressure sensor assembly of claim 11, further comprising an exhaust plug to plug the exhaust hole after the cavity is filled with the non-compressible gel or liquid.

13. The pressure sensor assembly of claim 1, wherein the cavity is filled with a first non-compressible gel or liquid adjacent the pressure sensor and a second non-compressible gel or liquid adjacent the membrane.

\* \* \* \* \*